United States Patent
Lucas et al.

(10) Patent No.: US 10,920,535 B1
(45) Date of Patent: Feb. 16, 2021

(54) INJECTION METHOD FOR HIGH VISCOSITY DRY FRICTION REDUCER TO INCREASE VISCOSITY AND PUMP EFFICIENCY

(71) Applicant: Halliburton Energy Services, Inc., Houston, TX (US)

(72) Inventors: Bryan Chapman Lucas, Edmond, OK (US); Timothy Patrick Jass, Castroville, TX (US); Carl William Fey, San Antonio, TX (US); Eric Perez, San Antonio, TX (US); Harvey Joseph Fitzpatrick, Jr., Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/573,270

(22) Filed: Sep. 17, 2019

(51) Int. Cl.
   *E21B 37/06* (2006.01)
   *E21B 41/02* (2006.01)
   *E21B 43/267* (2006.01)

(52) U.S. Cl.
   CPC .............. *E21B 37/06* (2013.01); *E21B 41/02* (2013.01); *E21B 43/267* (2013.01); *C09K 2208/28* (2013.01)

(58) Field of Classification Search
   CPC ......... E21B 37/06; E21B 41/02; E21B 43/267
   See application file for complete search history.

(56) References Cited

U.S. PATENT DOCUMENTS 8,360,152 B2 * 1/2013 DeFosse ............... E21B 21/062
                                                  166/308.2
8,669,213 B2   3/2014 Gupta et al.
(Continued)

FOREIGN PATENT DOCUMENTS

WO   WO-2017192151 A1 * 11/2017 ............ B01F 3/1271
WO   2019152042 A1   8/2019

OTHER PUBLICATIONS

Foreign Communication from Related Application—International Search Report and Written Opinion of the Internationa Searching Authority, International Application No. PCT/US2020/032009, dated Aug. 25, 2020, 9 pages.
(Continued)

*Primary Examiner* — Matthew R Buck
(74) *Attorney, Agent, or Firm* — Conley Rose, P.C.; Rodney B. Carroll

(57) ABSTRACT

A method of placing a slurry stream comprising dry friction reducer (DFR) into a subterranean formation comprising: forming a slurry comprising an aqueous-based fluid and a proppant by introducing a dry material comprising the proppant and the aqueous-based fluid into a blender; forming a DFR slurry stream comprising DFR; and introducing the DFR slurry stream into the formation, wherein forming the DFR slurry stream comprises: forming a DFR concentrate; adding the DFR concentrate into the slurry in the blender at a location within the blender distant a location at which the dry material is added thereto, and removing the DFR slurry stream from the blender; forming a DFR concentrate, removing a slurry stream from the blender, and adding the DFR concentrate into the slurry stream to provide the DFR slurry stream; and/or introducing dry, powdered DFR into the blender and removing the DFR slurry stream from the blender.

20 Claims, 13 Drawing Sheets

(56) References Cited

U.S. PATENT DOCUMENTS

| | | | |
|---|---|---|---|
| 8,800,659 B2 | 8/2014 | Nichols | |
| 9,206,679 B2 | 12/2015 | Gupta et al. | |
| 9,353,613 B2* | 5/2016 | Soliman | E21B 21/062 |
| 9,404,033 B2* | 8/2016 | Perry | E21B 43/26 |
| 2003/0161212 A1* | 8/2003 | Neal | E21B 43/267 |
| | | | 366/10 |
| 2008/0064614 A1 | 3/2008 | Ahrenst et al. | |
| 2008/0087432 A1 | 4/2008 | Wood et al. | |
| 2008/0264641 A1* | 10/2008 | Slabaugh | B01F 3/1207 |
| | | | 166/308.2 |
| 2009/0301725 A1* | 12/2009 | Case | E21B 43/267 |
| | | | 166/308.1 |
| 2014/0041874 A1* | 2/2014 | Schultheiss | E21B 41/02 |
| | | | 166/305.1 |
| 2015/0345269 A1* | 12/2015 | Kelly | E21B 21/062 |
| | | | 166/280.1 |
| 2016/0245045 A1 | 8/2016 | Burnette et al. | |
| 2017/0267916 A1* | 9/2017 | Singh | C09K 8/605 |
| 2017/0292061 A1 | 10/2017 | Zhang | |
| 2017/0362497 A1 | 12/2017 | Tang et al. | |
| 2019/0009232 A1 | 1/2019 | Yeung | |

OTHER PUBLICATIONS

Jain, Samyak, et al., "Friction Pressure Performance of Commonly Used Viscous Gravel-Packing Fluids," SPE Drilling & Completion, Jun. 2011, pp. 227-237, Society of Petroleum Engineers.

Nakra, Geeta, et al., "Mobile Mixer Adds Dry Friction Reducer to Fracturing Fluid at the Wellsite," Journal of Petroleum Technology, Jul. 2013, pp. 28-30.

Sanders, Michael, et al., "Dry Polyacrylamide Friction Reducer: Not Just for Slick Water," Society of Petroleum Engineers, 2016, SPE-179146-MS, pp. 1-13, Society of Petroleum Engineers.

Woodroof, Robert A., et al., "Synthetic Polymer Friction Reducers Can Cause Formation Damage," Society of Petroleum Engineers of AIME, 1977, SPE 6812, pp. 1-15, American Institute of mining, Metallurgical, and Petroleum Engineers, Inc.

* cited by examiner

INJECTION METHOD FOR HIGH VISCOSITY DRY FRICTION REDUCER TO INCREASE VISCOSITY AND PUMP EFFICIENCY

TECHNICAL FIELD

The present disclosure relates generally to methods and apparatus for introducing a dry friction reducer (DFR), such as a high viscosity friction reducer (HVDFR), into a slurry whereby a viscosity of the slurry and a pump efficiency can be increased and/or maintained. More particularly, the present disclosure relates to methods and apparatus for introducing a DFR or HVDFR (also referred to herein as a DFR/HVDFR), into a slurry for introduction (e.g., injection) into a wellbore, whereby a viscosity of the slurry and a pump efficiency of one or more pumps utilized to pump the resulting slurry can be increased and/or maintained

BACKGROUND

Mixing and pumping High Viscosity Dry Friction Reducer (HVDFR) and Dry Friction Reducer (DFR) with conventional additive injection methods can lead to equipment function issues due to a large amount of air entrainment. Such equipment function issues can, in turn, lead to job execution issues, higher equipment maintenance costs, and/or increased NPT (Non-Productive Time). By way of example, such equipment function issues can include, without limitation, inefficiency of a blender discharge pump, resulting in pump rate and/or pressure losses; inefficiencies of HHP (high horsepower pumps; e.g., high rate downhole positive displacement pumps, such as Quintuplex and Triplex pumps (e.g., Q10), HT-2000, etc.), difficulty achieving a design rate promised to customers; difficulty achieving a design proppant concentration promised to customers, and inadequate viscosity of the DFR. HHP inefficiencies include HHP losing prime on pumps, HHP not receiving sufficient suction side boost pressure to operate smoothly and efficiently, and HHP not receiving enough suction side fluid rate and boost pressure to achieve design treatment rate. Achieving the design rate can become difficult, if not impossible, if a pressure of a blender discharge decreases. If a design proppant concentration is not achieved, fracture conductivity can also be compromised. Inadequate viscosity of the DFR can result from slow or inadequate hydration, low fluid DFR concentration and/or exposure of the DFR fluid to shear. DFRs such as polyacrylamide (PAM) FRs are shear sensitive and do not reheal. Inadequate viscosity of the DFR can lead a reduction in proppant transport capability.

When a DFR or a high viscosity DFR (HVDFR) is added to a fluid upstream of the proppant, a significant volume of air can be introduced into the system as proppant is added into the fluid. This is not an issue with water, liquid FR's, or gels with a guar or derivative guar variants, as the rheological properties of these materials can effectively allow mitigation of the entrained air in the fluid. However, the rheological properties of fluids containing DFR/HVDFR can be such that the entrained air cannot adequately escape.

Accordingly, there exists a need for a system and method for introducing a DFR/HVDFR whereby a viscosity of the resulting fluid and pump efficiency can be increased or maintained.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
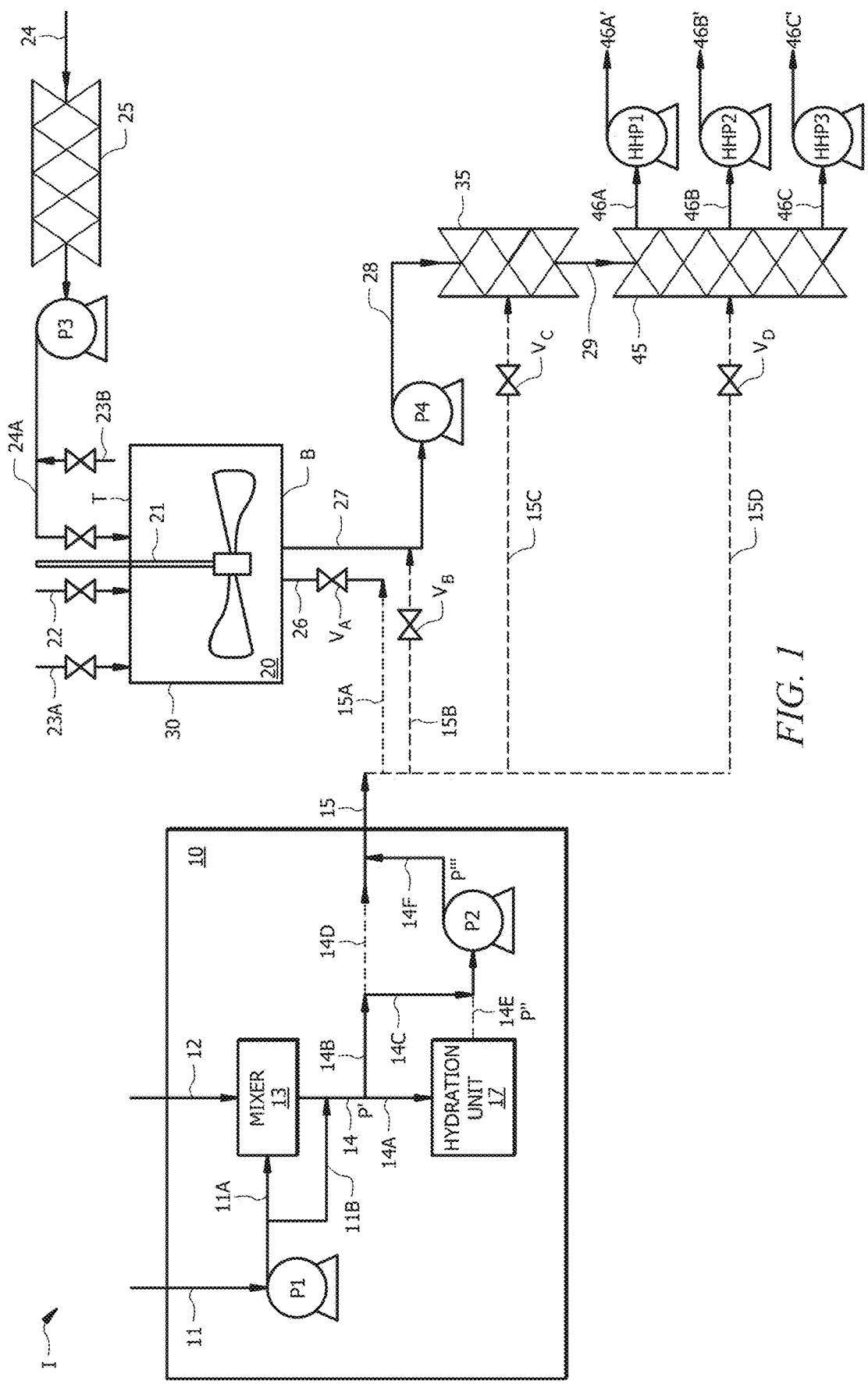
FIG. 1 is a schematic of a dry friction reducer/high viscosity dry friction reducer (DFR/HVDFR) system I, according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As utilized herein, a "slurry" is a pumpable fluid comprising a carrier fluid (e.g., aqueous fluid) and one or more solid components (e.g., proppant).

Overview

Herein disclosed are systems and methods for using a fast acting or fast hydrating friction reducer (FR). In embodiments, no extra in-fluid residence time is utilized in addition to a transit time in the equipment, manifolds and hoses from a point of mixing the dry material (e.g., dry DFR/HVDFR) with water to produce a DFR/HVDFR concentrate to a point of addition of the DFR/HVDFR concentrate to a slurry or "treatment fluid". (Although described with reference to mixing the DFR/HVDFR with 'water' herein, the water can be provided as a component of an "aqueous fluid" comprising water, in embodiments. For example, the dry material can be mixed with water or with an aqueous fluid comprising water comprising some composition of total dissolved solids (TDS)/salts or total suspended solids (TSS).) Thus, in embodiments, no separate hydration or conditioning tank is utilized to provide additional residence time for the DFR/HVDFR to become active prior to incorporation into the slurry or "treatment fluid". Via the systems and methods, other dry materials (e.g., proppant) can be added to the process fluid slurry without causing a reduced delivery rate of process fluid blender equipment (e.g., a slurry blender, as described hereinbelow) and/or a reduced output pressure of pump(s) (e.g., a slurry blender discharge pump, as described hereinbelow) utilized to pump the slurry.

As noted above, because a fluid containing a fast acting or fast hydrating friction reducer has properties which can promote inefficient mixing and pumping performance upon addition to a fluid, by gravity induced free fall through air, of other dry materials, the normal function of conventional fluid slurry blending and pumping equipment is typically impeded and a throughput volumetric flow rate and pressure output performance significantly reduced in proportion to the levels of dry friction reducer and other dry additives used to formulate a process slurry comprising same. As mentioned hereinabove, this reduction in performance can be caused by excess air entrainment in a slurry comprising the fluid and dry additives or other slurry parameters induced by the presence of the DFR/HVDFR and other dry additives. Dry additives can include, without limitation, sand, proppant, and/or dry materials used to impart specific functions to the mixed process slurry.

In embodiments, a system and method of preparing a slurry comprising a DFR/HVDFR as per this disclosure provides for mixing a DFR/HVDFR with water to form a DFR/HVDFR concentrate and adding the DFR/HVDFR concentrate to a treatment fluid stream or slurry, without the use of a hydration tank or holding vessel for providing residence time, with minimized hydration time for the DFR/HVDFR concentrate (e.g., only a time of mixing and transit to a point of addition to the slurry), and/or at a point in the treatment fluid or slurry which allows the resulting DFR/HVDFR containing slurry to have reduced air entrainment caused by the addition of other dry additive materials.

In embodiments, a system and method of preparing a slurry comprising a DFR/HVDFR as per this disclosure provides for addition of the DFR/HVDFR as a dry (e.g., powdered) material directly into the treatment fluid or slurry, whereby a pressure and delivery rate performance of a pump utilized to pump the DFR/HVDFR containing slurry are not affected by the addition of materials to the fluid stream or slurry either by increased air entrainment or otherwise (e.g., by viscosity).

In embodiments, a system and method of this disclosure provide for bypassing of a hydration tank of an existing pre-gel blender unit (e.g., a blending unit operated without proppant) that is conventionally utilized to hydrate dry materials (e.g., dry DFR/HVDFR). Due to the speed at which the DFR/HVDFR material of this disclosure hydrates with the hereinbelow disclosed system and the desire, as taught herein, to mitigate exposure of the DFR/HVDFR to shear, such a conventional hydration tank is bypassed, in embodiments, and the DFR/HVDFR (e.g., polymer) mixed with a fluid (e.g., water) to provide a DFR/HVDFR concentrate and the DFR/HVDFR concentrate introduced (e.g., injected) into a treatment fluid or slurry without introduction into a hydration tank. For example, in embodiments, the DFR/HVDFR concentrate is introduced directly into a discharge manifold of a slurry blender (e.g., a blending unit operated with proppant). This introduction or injection can be subsequent to a discharge centrifugal pump (e.g., a slurry blender discharge pump, as described hereinbelow) of the slurry blender. In such embodiments, since the introduction point for the DFR/HVDFR concentrate is downstream from (e.g., after) the discharge pump of the slurry blender and the hydration tank of the blending unit operated without proppant is bypassed, issues with entrained air can be mitigated, and losses and/or fluctuations in discharge pressure and rate of the discharge pump of the slurry blender not encountered and/or minimized.

Conventional systems are designed for introduction of DFR/HVDFR by mixing a fluid containing HVDFR/DFR in a mixer, holding the DFR/HVDFR containing fluid in a tank (e.g., a hydration tank) to allow an extended time for hydration before use in a treatment fluid, injecting and metering the DFR/HVDFR containing fluid into a treatment fluid stream after holding in the hydration tank for a period of time allowing sufficient hydration.

The DFR/HVDFR concentrate may be injected into: a suction manifold of a slurry blending unit; a tub or "slurry blender" (e.g., a blending unit with proppant) of the slurry blending unit; a slurry blender discharge pump suction manifold; a slurry blender discharge manifold; a discharge manifold for HHP pumps suctions; or a combination of any and all of these injection points. However, use of any of or a combination of these injection points upstream of the point of sand (e.g., proppant) additions can lead to a reduction in a discharge pressure of the slurry blending unit (e.g., of a slurry blender discharge pump thereof). This reduction in pressure can lead to losses in rate and/or cavitation of downstream HHP. Conventional methods can include up to 4 points of shear for the DFR/HVDFR (e.g., polymer) prior to the HHP. These points of shear include: a pre-gel (e.g., centrifugal) pump, a slurry blender suction (e.g., centrifugal) pump, a slurry blender agitator, and the slurry blender discharge (e.g., centrifugal) pump. By bypassing the hydration tank of the pre-gel blending unit (e.g., the blending unit without proppant) and not introducing the DFR/HVDFR concentrate into the suction manifold of the slurry blending unit, as described herein, the disclosed system and method allow for a decrease in the number of points of shear to which a DFR/HVDFR concentrate is exposed. Bypassing a hydration tank of a DFR/HVDFR pre-gel blending unit and/or adding a DFR/HVDFR concentrate into a fluid stream at a point without proppant (e.g., introducing or injecting the DFR/HVDFR concentrate into a slurry blender discharge manifold downstream of the slurry blender and/or downstream of a location in the slurry blender at which proppant is introduced), as per embodiments of this disclosure detailed hereinbelow, can provide advantages including, without limitation, increased pump efficiency for a slurry blender discharge (e.g., centrifugal) pump and reduced exposure of the DFR/HVDFR (e.g., polymer) concentrate to shear, thus resulting in higher viscosity and proppant transport capabilities of the resulting slurry comprising DFR/HVDFR.

Additionally, in embodiments, the system and method of this disclosure allow for a reduction or minimization of NPT, thus providing cost savings. Increasing an efficiency of the slurry blender discharge pump can provide advantages including, but not limited to reducing maintenance issues associated with the slurry blender discharge pump, and thus concomitantly decreasing maintenance costs associated therewith and/or decreasing NPT. A more consistent discharge pressure of the slurry blender discharge pump can provide one or more of the following advantages: reduced cavitation on HHP, which can provide for reduced wear, for example, on pump fluid ends and wear items, such as, without limitation, valves and plungers of the HHP, and reduced fluctuations in HHP discharge pressure.

Introducing/injecting the DFR/HVDFR (e.g., polymer) concentrate into an environment with less shear, as per this disclosure, can lead to one or more of the following advantages: higher proppant transport due to higher slurry viscosity and/or utilization of a reduced amount of DFR/HVDFR to build a desired slurry viscosity. Utilization of a reduced amount of DFR/HVDFR can result in reduced gel damage to a subterranean formation, leading to higher conductivity and permeability, and cost savings.

System for Adding a Slurry Comprising DFR/HVDFR into a Formation

Herein disclosed is a system for adding a slurry comprising dry friction reducer (DFR) into a subterranean formation. The system comprises a slurry blender comprising an agitator and configured to produce a slurry comprising a proppant in an aqueous-based fluid; a slurry blender suction pump fluidly connected with the slurry blender and with a slurry blender suction manifold and operable to introduce the aqueous-based fluid from the slurry blender suction manifold into the slurry blender; a slurry blender discharge pump fluidly connected via a slurry blender discharge line with an outlet of the slurry blender and operable to introduce slurry from the slurry blender into a slurry blender discharge manifold; one or more high horsepower pumps (HHP) fluidly connected via an HHP manifold and a slurry blender discharge manifold outlet line with the slurry blender discharge manifold and operable to inject the slurry from the HHP manifold into the formation; and (a) apparatus configured for introducing DFR/HVDFR in dry, powdered form directly into the slurry blender to produce the slurry comprising DFR/HVDFR that is removed from the slurry blender via the slurry blender discharge line; and/or (b) DFR/HVDFR concentrate production apparatus configured to provide a DFR/HVDFR concentrate comprising water and DFR/HVDFR, and (i) a line fluidly connecting the DFR/HVDFR concentrate production apparatus with (e.g., a drain line of) the slurry blender, whereby the DFR/HVDFR concentrate is introduced into a location within the slurry blender distant a location at which dry materials are added thereto (e.g., a bottom of the slurry blender), and the slurry comprising DFR/HVDFR is removed from the slurry blender via the slurry blender discharge line, (ii) a line fluidly connecting the DFR/HVDFR concentrate production apparatus with the slurry blender discharge line upstream of the slurry blender discharge pump, whereby the DFR/HVDFR concentrate is introduced into the slurry in the slurry blender discharge line to provide the slurry comprising DFR/HVDFR; (iii) a line fluidly connecting the DFR/HVDFR concentrate production apparatus with the slurry blender discharge line downstream of the slurry blender discharge pump and upstream of the slurry blender discharge manifold and/or into the slurry blender discharge manifold, whereby the DFR/HVDFR concentrate is introduced into the slurry in the slurry blender discharge line and/or the slurry blender discharge manifold to provide the slurry comprising DFR/HVDFR; (iv) a line fluidly connecting the DFR/HVDFR concentrate production apparatus with the slurry blender discharge manifold outlet line downstream of the slurry blender discharge manifold and upstream of the HHP suction side discharge manifold and/or into the HHP suction side discharge manifold, whereby the DFR/HVDFR concentrate is introduced into the slurry in the slurry blender discharge manifold outlet line and/or the HHP manifold to provide the slurry comprising DFR/HVDFR; or (v) a combination thereof.

Description of a system of this disclosure will now be made with reference to the embodiment of FIG. 1, which is a schematic of a DFR/HVDFR system I, according to embodiments of this disclosure. System I comprises DFR/HVDFR concentrate production unit 10 (which is also referred to herein as a 'pre-gel unit" or "pre-gel blender" 10) operable to combine water in water line 11 with dry (e.g., powdered) DFR/HVDFR in dry DFR/HVDFR inlet line 12 to produce a DFR/HVDFR concentrate, which can be removed from DFR/HVDFR concentrate production unit 10 via DFR/HVDFR concentrate (or "pre-gel bender outlet") line 15.

DFR/HVDFR concentrate production unit 10 comprises one or more pumps and a mixer configured to produce an aqueous DFR/HVDFR concentrate containing DFR/HVDFR and water. In embodiments, the DFR/HVDFR concentrate has a concentration in a range of from about 1 to about 250, from about 1 to about 100, or from about 1 to about 50 pounds per gallon (lb/gal), or greater than or equal to about 1, 5, 10, 50, 100, or 250 lb/gal. DFR/HVDFR concentrate production unit 10 can comprise one or more pumps, for example a first pump and/or a second pump. In embodiments, such as depicted in FIG. 1, DFR/HVDFR concentrate production unit 10 comprises a first pump that is a pre-gel blender suction pump P1 and a second pump or pre-gel blender discharge pump P2. DFR/HVDFR concentrate production unit 10 also comprises a mixer 13. Mixer 13 is fluidly connected with pre-gel suction pump P1 by first P1 outlet line 11A, whereby at least a portion of a water stream in water line 11 is pumped via pre-gel suction pump P1 into mixer. Within mixer 13 of pre-gel blender 10, the portion of the water stream in water line 11 pumped into mixer 13 via first pump P1 outlet line 11A and powdered DFR/HVDFR introduced into mixer 13 via powdered or "dry" DFR/HVDFR inlet line 12, are mixed to produce a DFR/HVDFFR concentrate. The DFR/HVDFFR concentrate produced in mixer 13 can be removed therefrom via a pre-gel mixer outlet line 14. In embodiments, a second pump P1 outlet line 11B is configured to introduce a portion of the water in line 11 pumped through pre-gel suction pump P1 directly into pre-gel mixer outlet line 14, thus bypassing mixer 13. In this manner desired amounts of water can be employed within mixer 13 and within the concentrate stream in pre-gel mixer outlet line 14. For example, in embodiments, from about 10 to about 100, from about 18 to about 50, or from about 33 to about 67 weight percent (wt %) of the water in water line 11 is pumped via pre-gel suction pump P1 into mixer 13, while the remaining from about 0 to about 90, from about 50 to about 82, or from about 33 to about 67 wt % of the water in water line 11 is pumped via pre-gel suction pump P1 directly into pre-gel mixer outlet line 14. In embodiments, a total amount of water in the DFR/HVDFR concentrate in DFR/HVDFR concentrate line 15 removed from DFR/HVDFR concentrate production unit 10 is less than or equal to about 100, 90, 80, 70, 60, 50, 40, 30, 20, 10 or 2 wt % of the water in the DFR/HVDFR slurry or treatment fluid pumped downhole via the HHP.

In embodiments, DFR/HVDFFR concentrate production unit 10 comprises a hydration unit or hydration tank 17. Hydration unit 17 can be any hydration unit designed for or operable to allow a residence time for hydration of the DFR/HVDFR in the DFR/HVDFR concentrate introduced thereto. In embodiments, hydration tank 17 comprises baffles. In embodiments, as detailed hereinbelow, hydration tank 17 is present. In embodiments, hydration tank 17 is present, but bypassed, as detailed further hereinbelow. In embodiments, hydration tank 17 is absent from a system of this disclosure.

By way of example, in embodiments, pre-gel blender unit 10 is an existing pre-gel blender unit, for example mounted on a skid or trailer, and comprises a hydration unit or tank 17 configured to provide a residence time for hydration of a FR. In embodiments, such a hydration unit or tank 17 is bypassed, and the pre-gel mixer outlet line 14 is configured to bypass hydration tank 17. This may be enabled by the use as FR, a fast-acting DFR or HVDFR. In such embodiments, the DFR/HVDFR concentrate in mixer outlet line 14 bypasses hydration tank 17, as indicated by hydration unit bypass line 14B. In embodiments, no hydration unit is present in DFR/HVDFR concentrate production unit 10. In such embodiments, line 14A and 14 can be the same line. Alternatively, in embodiments, all or a portion (e.g., 10, 20, 30, 40, 50, 60, 70, 80, 90, or 100 volume percent) of the DFR/HVDFR concentrate in mixer outlet line 14 is introduced into hydration tank 17 via pre-gel hydration unit inlet line 14A, while the remaining portion (e.g., 90, 80, 70, 60, 50, 40, 30, 20, 10, or 0 volume percent) of the DFR/HVDFR concentrate in mixer outlet line 14 enters hydration unit bypass line 14B.

In embodiments, the DFR is a high viscosity dry friction reducer (HVDFR) defined as a DFR that, when added to a fluid such as a particulate slurry (e.g., proppant-laden fracturing fluid), lowers the particle critical sedimentation velocity of the particulate slurry. In embodiments, the DFR/HVDFR is a fast acting friction reducer. In embodiments, the DFR/HVDFR is a fast acting friction reducer which achieves its active function in a time interval of less than or equal to 60, 45, or 30 seconds. In embodiments, the DFR/HVDFR is a fast acting friction reducer which achieves at least 80 percent of its ultimate fluid friction reduction effect in a time interval of less than or equal to 60, 45, or 30 seconds. In embodiments, the DFR/HVDFR is a fast acting friction reducer which achieves at least 80 percent of its ultimate fluid viscosifying effect in a time interval of less than or equal to 60, 45, or 30 seconds. In embodiments, the DFR/HVDFR is a solid material at ambient temperature and pressure. In embodiments, the DFR/HVDFR is an associative entity capable of forming extended structures in a fluid. In embodiments, the DFR/HVDFR comprises a polymer. In embodiments, the DFR/HVDFR comprises a synthetic polymer. In embodiments, the DFR/HVDFR comprises anionic or cationic polymer. In embodiments, the polymer includes a high molecular weight polymer. In embodiments, the DFR/HVDFR comprises polyacrylamide (PAM). In embodiments, the DFR/HVDFR comprises PAM, polyacrylic acid, hydrolyzed polyacrylamide, acrylamidomethylpropane sulfonate, or a combination thereof. In embodiments, the DFR/HVDFR comprises a polyacrylamide (PAM) copolymer. In embodiments, the DFR/HVDFR has a combination of the aforementioned features (e.g., is an associative entity capable of forming extended structures in a fluid, a polymer, and comprises PAM).

As noted hereinabove, the DFR/HVDFR concentrate production apparatus 10 is configured to provide the DFR/HVDFR concentrate comprising water and DFR/HVDFR and can comprise pre-gel blender mixer 13 configured to mix the DFR/HVDFR with water to produce the DFR/HVDFR concentrate, and pre-gel blender suction pump P1 fluidly connected with the pre-gel blender mixer 13 and configured to introduce water into the mixer. In the embodiment of FIG. 1, pre-gel blender 10 further comprises second or pre-gel blender discharge pump P2. Pre-gel blender discharge pump P2 can be configured to pump the DFR/HVDFR concentrate downstream. In such embodiments, all or a portion (e.g., from about 0 to about 100, from about 5 to about 50, or from about 30 to about 100 volume percent) of the DFR/HVDFR concentrate in hydration unit bypass line 14B can be introduced into pre-gel blender discharge pump P2 via pump P2 non-bypass line 14C. In embodiments comprising hydration unit 17 and in which all of the DFR/HVDFR in mixer outlet line 14 does not bypass hydration unit 17, a pre-gel hydration unit outlet line 14E can be configured to introduce DFR/HVDFR concentrate from hydration unit 17 into pre-gel blender discharge pump P2. The DFR/HVDFR concentrate pumped via pre-gel discharge pump P2 (e.g., the DFR/HVDFR concentrate introduced into pre-gel blender discharge pump P2 via pre-gel pump P2 non-bypass line 14C and/or pre-gel hydration unit outlet line 14E) can be removed therefrom via pre-gel pump P2 outlet line 14F.

In embodiments, all or a portion (e.g., the remaining from about 0 to about 100, from about 5 to about 60, or from about 40 to about 100 volume percent of the DFR/HVDFR in pre-gel hydration unit bypass line 14B that is not introduced into pre-gel hydration unit discharge pump P2) of the DFR/HVDFR concentrate in hydration unit bypass line 14B bypasses pre-gel blender discharge pump P2, as indicated via line 14D. In embodiments, pre-gel discharge pump P2 bypass line 14D is a same line as (e.g., a downstream section of) pre-gel hydration unit bypass line 14B, which can itself be the same line as (e.g., a downstream section of) pre-gel mixer outlet line 14.

DFR/HVDFR concentrate produced in pre-gel blender unit 10 can be removed therefrom via DFR/HVDFR concentrate outlet line 15. In embodiments, DFR/HVDFR concentrate outlet line 15 is a same line as (e.g., is a downstream section of pre-gel discharge pump P2 bypass line 14D, which, as noted above, can be a same line as (e.g., a downstream section of) pre-gel hydration unit bypass line 14B, which can itself be the same line as (e.g., a downstream section of) pre-gel mixer outlet line 14.

In embodiments, pre-gel blender suction pump P1 (e.g., parallel combination of mixer 13 and pre-gel mixer pump P1) is operable to provide DFR/HVDFR concentrate in pre-gel mixer outlet line 14 having a pressure P' in a range of from about 0 to about 30, from about 10 to about 50, from about 30 to about 90, less than or equal to about 90, 60, or 20 psi, and/or greater than or equal to about 0, 30, or 60 psi. In embodiments, pre-gel blender discharge pump P2 is operable to increase the pressure of a fluid pumped thereby by a pressure ΔP of greater than or equal to about 30, 60, or 90 psi. In embodiments, hydration tank 17 is not bypassed at all (e.g., all of the DFR/HVDFR concentrate in pre-gel mixer outlet line 14 enters hydration tank 17, is removed at a pressure P" (e.g., substantially atmospheric pressure) from hydration tank 17 via pre-gel hydration unit outlet line 14E, and is pumped via pre-gel unit discharge pump P2, and the DFR/HVDFR concentrate in pre-gel discharge pump P2 outlet line 14F has a pressure P' (equal to pressure P'''+ΔP) in a range of from about 5 to about 30, from about 20 to about 60, from about 40 to about 110, less than or equal to about 110, 70, or 30 psi, and/or greater than or equal to about 5, 30, or 110 psi. In embodiments, hydration unit 17 is completely bypassed or absent, and pre-gel blender discharge pump P2 is operable to provide a pressure P'''' (equal to pressure P'+ΔP) in pre-gel discharge pump P2 outlet line 14F in a range of from about 0 to about 30, from about 20 to about 80, from about 30 to about 110, less than or equal to about 110, 80, or 30 psi, and/or greater than or equal to about 5, 30, or 110 psi.

In embodiments, hydration tank 17 is absent or completely bypassed (e.g., all of the DFR/HVDFR concentrate in mixer outlet line 14 follows hydration unit bypass line 14B) and pre-gel blender discharge pump P2 is completely not bypassed (e.g., all of the DFR/HVDFR in hydration unit bypass line 14B follows pre-gel blender discharge pump P2 non-bypass line 14C), and the DFR/HVDFR concentrate in DFR/HVDFR concentrate outlet line 15 has a pressure (equal to P'=P'+ΔP) in a range of from about 0 to about 30, from about 20 to about 80, from about 30 to about 110, less than or equal to about 110, 80, or 30 psi, and/or greater than or equal to about 5, 30, or 110 psi.

In embodiments, hydration tank 17 is completely not bypassed (e.g., all of the DFR/HVDFR concentrate in mixer outlet line 14 follows pre-gel hydration unit inlet line 14A) and pre-gel blender discharge pump P2 is completely not bypassed (e.g., all of the DFR/HVDFR in pre-gel hydration unit outlet line 14E enters pre-gel blender discharge pump P2), and the DFR/HVDFR concentrate in DFR/HVDFR concentrate outlet line 15 has a pressure (equal to P''''=P''+ΔP) in a range of from about 0 to about 30, from about 20 to about 80, from about 30 to about 110, less than or equal to about 110, 80, or 30 psi, and/or greater than or equal to about 5, 30, or 110 psi. In some such embodiments, P''' equals atmospheric pressure ($P_{ATM}$), and P' is substantially equal to $P_{ATM}$ plus ΔP.

In embodiments, hydration tank 17 is partially bypassed and pre-gel discharge pump P2 is partially bypassed, and the DFR/HVDFR concentrate in DFR/HVDFR concentrate outlet line has a pressure less than P'+P'''.

Pre-gel pump P2 of pre-gel blender 10 or another "boost" pump can be utilized to increase the pressure to a pressure sufficient to introduce the DFR/HVDFR concentrate downstream.

A system of this disclosure further comprises a slurry blender configured to produce a slurry comprising a proppant in an aqueous-based fluid. In the embodiment of FIG. 1, slurry blender 20 comprises a tank or vessel 30 and a slurry blender agitator 21.

Slurry blender 20 is fluidly connected with a slurry blender suction pump P3 operable to introduce an aqueous based fluid into slurry blender 20 via aqueous based fluid inlet line 24A. In embodiments, slurry blender suction pump P3 is fluidly connected with a slurry blender suction manifold 25. Slurry blender suction pump P3 is thus fluidly connected with the slurry blender 20 and with slurry blender suction manifold 25 and operable to introduce the aqueous-based fluid in aqueous based fluid line 24 from the slurry blender suction manifold 25 into the slurry blender 20. One or more aqueous based fluid lines, such as aqueous based fluid line 24 of the embodiment of FIG. 1, are fluidly connected with slurry blender suction manifold, for introducing aqueous based fluid thereto. The aqueous based fluid can be component (e.g., a base fluid) of a wellbore servicing fluid, in embodiments. In embodiments, the slurry (e.g., slurry stream) comprising DFR/HVDFR is a fracturing fluid, and the aqueous based fluid comprises a carrier for a fracturing or "frac" fluid. In embodiments, the aqueous based fluid comprises water, water with dissolved solids, water with suspended solids, water with a combination of dissolved and of suspended solids, recycled water, water produced from a well, waste water, fresh water, sea water, brine, an acid solution, an aqueous treating fluid formulation, or a combination thereof.

A solids line 22 (also referred to herein as a "proppant" line 22) can be configured for introducing a solid, particulate material into slurry blender 20. In embodiments, the solid, particulate material comprises sand, mineral particulates, particulates sourced or produced from fauna or flora materials, diverter material, solid treatment fluid additives including but not limited to—biocides, scale inhibitors, surfactants, flow back aid agents, activators, retarders, rheology modifiers, and any combination of these—and man-made particulates. Solids or "proppant" line 22 can be configured to introduce the solid material (e.g., in a dry form; dry proppant) by gravity (e.g., free fall) into a slurry in slurry blender 20, in embodiments. In embodiments, the proppant comprises sand, treated sand, ceramic materials, man-made particles, particles comprising a polymeric material, particles of material sourced from flora (e.g., the plant kingdom), particles comprising a composite, particles comprising a primary structural material and a secondary added material, or a combination thereof. In embodiments, the solid, particulate material comprises dry proppant, and the dry proppant is introduced into the slurry blender 20 by gravity feeding of the dry proppant into the slurry blender 20 via proppant inlet line 22.

Slurry blender 20 combines the solid material introduced thereto via solids inlet line 22 with the aqueous based fluid introduced thereto via aqueous based fluid inlet line 24A to produce a slurry, which is agitated within slurry blender 20 via slurry blender agitator 21. Various slurry agitators (e.g., a paddle agitator) can be utilized. A slurry blender drain line 26 can be fluidly connected with a bottom of slurry blender 20, and configured for draining slurry blender 20. (As detailed hereinbelow, in embodiments, DFR/HVDFR concentrate can be introduced into slurry blender 20 below a point of contact of the solids introduced via solids inlet line 22, for example via the slurry blender drain line 26.)

One or more other components can be introduced into slurry blender 20 via one or more other component inlet lines, such as other component inlet lines 23A and 23B of the embodiment of FIG. 1. Other component inlet line 23A introduces the other component(s) into slurry blender 20 directly, while other component line 23B introduces the other component(s) by introduction thereto into aqueous based fluid inlet line 24A. The other component can comprise, for example, a breaking agent, dry, powdered DFR/HVDFR, wet or dry treating chemicals, biocides, surfactants, scale inhibitors, flow-back aid agents, activators, retarders, rheology modifiers, or a combination thereof. In embodiments, detailed hereinbelow with reference to the embodiment of FIG. 6, other component line 23A can be configured for the introduction of DFR/HVDFR in dry, powdered form via a top T of slurry blender 20, separately or in combination with the solids material introduced via solids inlet line 22. That is, a single line 22/23A can be utilized, in embodiments, to introduce (e.g., a mixture of) solids (e.g., proppant) and dry, powdered DFR/HVDFR into slurry blender 20. In such embodiments, DFR/HVDFR concentrate production unit 20 can be absent from the system or not utilized. In embodiments, dry, powdered DFR/HVDFR is not added to slurry blender 20, and/or DFR/HVDFR (dry, mixed with a liquid, or DFR/HVDFR concentrate) is not added to a top section of slurry blender 20 (e.g., a top 10, 20, 30% of slurry blender 20).

A system of this disclosure can further comprise a slurry blender discharge pump P4 fluidly connected via a slurry blender discharge line 27 with an outlet of the slurry blender 20, fluidly connected with a slurry blender discharge manifold 35, and operable to introduce slurry from the slurry blender 20 into the slurry blender discharge manifold 35. Pumps P1, P2, P3, and/or P4 can comprise centrifugal pumps.

A system of this disclosure can further comprise one or more high horsepower pumps (HHP) fluidly connected via an HHP suction side discharge manifold 45 (HHP suction side discharge manifold 45 comprises a discharge manifold upstream of HHP pump suctions) and a slurry blender discharge manifold outlet line 29 with the slurry blender discharge manifold 35 and operable to inject the slurry from the HHP suction side discharge manifold 45 into the formation. In the embodiment of FIG. 1, system I comprises three HHP, HHP1, HHP2, and HHP3, fluidly connected with HHP suction side discharge manifold 45 via HHP inlet lines 46A, 46B, and 46C, respectively. Slurry is pumped from the HHP via HHP outlet lines 46A', 46B', and 46C', respectively. The HHP can be any high horsepower pumps. For example, in embodiments, the HHP comprise high rate downhole positive displacement pumps, such as Quintuplex and Triplex pumps (e.g., Q10), HT-2000, etc.

As noted above, a system of this disclosure can further comprise: (i) a line fluidly connecting the DFR/HVDFR concentrate production apparatus 10 with (e.g., a drain line of) the slurry blender, whereby the DFR/HVDFR concentrate is introduced into a location within the slurry blender distant a location at which dry materials are added thereto (e.g., a bottom B or via a lower portion (e.g., a lower 40, 30, 20, or 10% of sides S of slurry blender 20) of the slurry blender 20 when dry materials are added at a top T thereof), and the slurry comprising DFR/HVDFR is removed from the slurry blender via the slurry blender discharge line 27 of the slurry blender 20. For example, as depicted in the embodiment of FIG. 1 and the embodiment of FIG. 2, which is a schematic of a DFR/HVDFR system II, according to embodiments of this disclosure, system I and system II of this disclosure comprise first DFR/HVDFR concentrate line 15A that fluidly connects the DFR/HVDFR concentrate production apparatus 10 with drain line 26 of the slurry blender 20. First DFR/HVDFR concentrate line 15A can be utilized to introduce slurry into a bottom of the slurry blender 20. In such embodiments, a slurry comprising DFR/HVDFR is removed from the slurry blender 20 via the slurry blender discharge line 27. Alternatively, first DFR/HVDFR concentrate line 15A can be configured for introduction of DFR/HVDFR concentrate at a point beneath an elevation at which solid material from solids inlet line 22 contact the aqueous fluid (e.g., the slurry) in slurry blender 20. For example, in embodiments a first DFR/HVDFR concentrate line 15A is configured for introduction of the DFR/HVDFR concentrate from DFR/HVDFR concentrate line 15 into a lower 5, 10, 20, 30, 40, 50, 60, 70, or 80% of slurry blender 20. For example, first DFR/HVDFR concentrate line 15A can introduce DFR/HVDFR concentrate from DFR/HVDFR concentrate line 15 into bottom B or sides S of slurry blender 20. Thus, although depicted as such in FIG. 1 and FIG. 2, first DFR/HVDFR concentrate line 15A need not be a slurry blender drain line, in embodiments. A valve $V_A$ may be present on first DFR/HVDFR concentrate line 15A, for controlling flow of DFR/HVDFR concentrate therethrough.

As noted above, a system of this disclosure can further comprise: (ii) a line fluidly connecting the DFR/HVDFR concentrate production apparatus with the slurry blender discharge line upstream of the slurry blender discharge pump, whereby the DFR/HVDFR concentrate is introduced into the slurry in the slurry blender discharge line to provide the slurry comprising DFR. For example, as depicted in the embodiment of FIG. 1 and the embodiment of FIG. 3, which is a schematic of a DFR/HVDFR system III, according to embodiments of this disclosure, system I and system III of this disclosure comprise second DFR/HVDFR concentrate line 15B that fluidly connects the DFR/HVDFR concentrate production apparatus 10 with the slurry blender discharge line 27 upstream of the slurry blender discharge pump P4. A valve $V_B$ may be present on second DFR/HVDFR concentrate line 15B, for controlling flow of DFR/HVDFR concentrate therethrough.

As noted above, a system of this disclosure can further comprise: (iii) a line fluidly connecting the DFR/HVDFR concentrate production apparatus with the slurry blender discharge line downstream of the slurry blender discharge pump and upstream of the slurry blender discharge manifold and/or into the slurry blender discharge manifold, whereby the DFR/HVDFR concentrate is introduced into the slurry in the slurry blender discharge line and/or the slurry blender discharge manifold to provide the slurry comprising DFR/HVDFR. For example, as depicted in the embodiment of FIG. 1 and the embodiment of FIG. 4, which is a schematic of a DFR/HVDFR system IV, according to embodiments of this disclosure, system I and system IV of this disclosure comprise third DFR/HVDFR concentrate line 15C that fluidly connects the DFR/HVDFR concentrate production apparatus 10 with the slurry blender discharge manifold 35, whereby the DFR/HVDFR concentrate can be introduced into the slurry blender discharge manifold 35. Alternatively, or additionally, third DFR/HVDFR concentrate line 15C can fluidly connect DFR/HVDFR concentrate production apparatus 10 with slurry discharge pump outlet line 28 (e.g., downstream of the slurry blender discharge pump P4 and upstream of the slurry blender discharge manifold 35). A valve $V_C$ may be present on third DFR/HVDFR concentrate line 15C, for controlling flow of DFR/HVDFR concentrate therethrough.

As noted above, a system of this disclosure can further comprise: (iv) a line fluidly connecting the DFR/HVDFR concentrate production apparatus with the slurry blender discharge manifold outlet line downstream of the slurry blender discharge manifold and upstream of the HHP suction side discharge manifold and/or into the HHP suction side discharge manifold, whereby the DFR/HVDFR concentrate is introduced into the slurry in the slurry blender discharge manifold outlet line and/or the HHP manifold to provide the slurry comprising DFR/HVDFR. For example, as depicted in the embodiment of FIG. 1 and the embodiment of FIG. 5, which is a schematic of a DFR/HVDFR system V, according to embodiments of this disclosure, system I and system V of this disclosure comprise fourth DFR/HVDFR concentrate line 15D that fluidly connects the DFR/HVDFR concentrate production apparatus 10 with the HHP suction side discharge manifold 45, whereby the DFR/HVDFR concentrate can be introduced into the HHP suction side discharge manifold 45. Alternatively, or additionally, a fourth DFR/HVDFR concentrate line 15D can fluidly connect DFR/HVDFR concentrate production apparatus 10 with slurry blender discharge manifold outlet line 29 (e.g., downstream of the slurry blender discharge manifold 35 and upstream of the HHP suction side discharge manifold 45). A valve $V_D$ may be present on first DFR/HVDFR concentrate line 15D, for controlling flow of DFR/HVDFR concentrate therethrough.

In embodiments, a system of this disclosure comprises a combination of zero, one, or a plurality of each of (i) through (iv), and thus can comprise a combination and/or a plurality of first DFR/HVDFR concentrate line(s) 15A, second DFR/HVDFR concentrate line(s) 15B, third DFR/HVDFR concentrate line(s) 15C, and/or fourth DFR/HVDFR concentrate line(s) 15D.

Method for Adding a Slurry Comprising DFR/HVDFR into a Formation

Also disclosed herein is a method for adding the slurry comprising DFR/HVDFR into a subterranean formation. According to this disclosure, a method of placing a slurry comprising DFR/HVDFR into a formation penetrated by a wellbore comprises forming a slurry comprising an aqueous-based fluid and a proppant, forming a slurry stream comprising DFR/HVDFR, and introducing the slurry stream comprising DFR/HVDFR into the formation via the wellbore.

In embodiments, forming the slurry comprises introducing a dry material comprising the proppant and/or a dry additive and the aqueous-based fluid into a slurry blender. For example, with reference back to the embodiment of FIG. 1, forming the slurry can comprise introducing a dry, solids material via solids inlet line 22 and an aqueous based fluid in aqueous based fluid inlet line 24A into slurry blender 20. The aqueous based fluid in line 24A can be obtained by introducing the aqueous based fluid into a slurry blender suction manifold 25 via an aqueous based fluid line 24, pumping the aqueous based fluid from the slurry blender suction manifold 25 into the slurry bender 20 via aqueous based fluid inlet line 24B. One or more additives or additional components can be added directly into slurry blender 20 via other component inlet line 23A and/or indirectly into slurry blender 20 via introduction of the other component into aqueous based fluid inlet line 24A via other component inlet line 23B.

Forming a slurry stream comprising DFR/HVDFR can comprise forming a DFR/HVDFR concentrate via DFR/HVDFR production unit 10, as described hereinabove and detailed further hereinbelow. In embodiments, the DFR/HVDFR concentrate has a concentration of DFR/HVDFR that is at least 1, 5, 10, 20, 30, 40, 50, 60, 70, 80, 90, or 100 times a desired DFR/HVDFR concentration in the slurry (e.g., to be introduced (e.g., pumped via HHP) into the formation).

Combining DFR/HVDFR with the amount of water to provide the DFR/HVDFR concentrate can further comprise mixing water with the DFR/HVDFR in pre-gel blender mixer 13 to form the DFR/HVDFR concentrate and removing the DFR/HVDFR concentrate from the mixer 13. Forming the DFR/HVDFR concentrate in DFR/HVDFR concentrate production unit 10 can comprise introducing DFR/HVDFR (e.g., dry and/or powdered DFR/HVDFR), via DFR/HVDFR inlet line 12, and water via water inlet line 11, pre-gel suction pump P1, and first pump P1 outlet line 11A, into mixer 13, wherein mixer 13 mixes the DFR/HVDFR and the water, and removing a DFR/HVDFR concentrate from mixer 13 via pre-gel mixer outlet line 14. Second pump P1 outlet line 11B can be utilized to add additional water into pre-gel mixer outlet line 14 via pre-gel blender suction pump P1.

As discussed hereinabove, in embodiments, hydration unit 17 is absent from the system or is bypassed completely or in part via hydration unit bypass line 14B. In such embodiments, the method may not comprise allowing the DFR/HVDFR concentrate to hydrate in a hydration unit 17 for a hydration residence time. For example, in embodiments, hydration unit 17 is absent or bypassed completely, and all of the DFR/HVDFR concentrate in pre-gel mixer outlet line 14 is not introduced into a hydration unit 17. In some such embodiments, the DFR/HVDFR concentrate in pre-gel mixer outlet line 14 (which can be the same, in this embodiment, as hydration unit bypass line 14B) has a pressure substantially equal to pressure P', described hereinabove, and can comprise the DFR/HVDFR concentrate from DFR/HVDFR concentrate line 15 passed downstream via first DFR/HVDFR concentrate line 15A, second DFR/HVDFR concentrate line 15B, third DFR/HVDFR concentrate line 15C, and/or fourth DFR/HVDFR concentrate line 15D. In such embodiments, the DFR/HVDFR concentrate in DFR/HVDFR concentrate line 15 can have a pressure substantially equal to that of P'. Accordingly, pre-gel blender suction pump P1 can be selected to provide a sufficient pressure for introducing the DFR/HVDFR concentrate downstream.

Alternatively, during forming of the DFR/HVDFR concentrate, at least a portion of the DFR/HVDFR concentrate in hydration unit bypass line 14B is introduced into pre-gel blender discharge pump P2 via pre-gel discharge pump P2 non-bypass line 14C. In embodiments, all of the DFR/HVDFR concentrate in hydration unit bypass line 14B is introduced into pre-gel blender discharge pump P2, whereby the pressure is increased by a pressure increase $\Delta P$ from pressure P' to a pressure P''. Accordingly, in such embodiments, the DFR/HVDFR concentrate in DFR/HVDFR concentrate line 15 can have a pressure substantially equal to that of P''. In other embodiments, a portion less than the entirety of the DFR/HVDFR concentrate in hydration unit bypass line 14B is introduced into pre-gel blender discharge pump P2. In such embodiments, the DFR/HVDFR concentrate in DFR/HVDFR concentrate line 15 can have a pressure between P' and P''. In such embodiments, pre-gel blender suction pump P1 and/or pre-gel blender discharge pump P2 and/or an amount of DFR/HVDFR concentrate that bypasses pre-gel blender discharge pump P2 can be selected/operated to provide a sufficient pressure for introducing the DFR/HVDFR concentrate downstream.

Alternatively, during forming of the DFR/HVDFR concentrate at least a portion of the DFR/HVDFR in pre-gel mixer outlet line 14 is introduced into a hydration unit 17. In embodiments, a residence time in hydration unit 17 is less than about 120, 360, 600, or 3600 s. In such embodiments, the DFR/HVDFR from hydration unit 17 can be introduced into pre-gel blender discharge pump P2, whereby the pressure can be increased by $\Delta P$ to pressure P'''. In embodiments, as noted above, hydration unit 17 is operated at atmospheric pressure, and P''' is substantially equal to $P_{ATM}+\Delta P$. In embodiments wherein all of the DFR/HVDFR in pre-gel mixer outlet line 14 is introduced into hydration tank 17, the pressure of the DFR/HVDFR concentrate in DFR/HVDFR concentrate line 15 is substantially equal to P'''. In embodiments wherein a portion of the DFR/HVDFR in pre-gel mixer outlet line 14 bypasses the hydration unit 17 and a portion enters the hydration unit 17, and the portion that bypasses the hydration unit 17 via hydration unit bypass line 14B also bypasses pre-gel blender discharge pump P2 via pump P2 bypass line 14D, a pressure of the DFR/HVDFR concentrate in DFR/HVDFR concentrate line 15 can be between P' and P''' (e.g., between P' and ($\Delta$P+$P_{ATM}$)). In such embodiments, pre-gel blender suction pump P1 and/or pre-gel blender discharge pump P2 and/or an amount of DFR/HVDFR concentrate that bypasses hydration unit 17 and/or pre-gel blender discharge pump P2 can be selected/operated to provide a sufficient pressure for introducing the DFR/HVDFR concentrate downstream.

Figure 2:
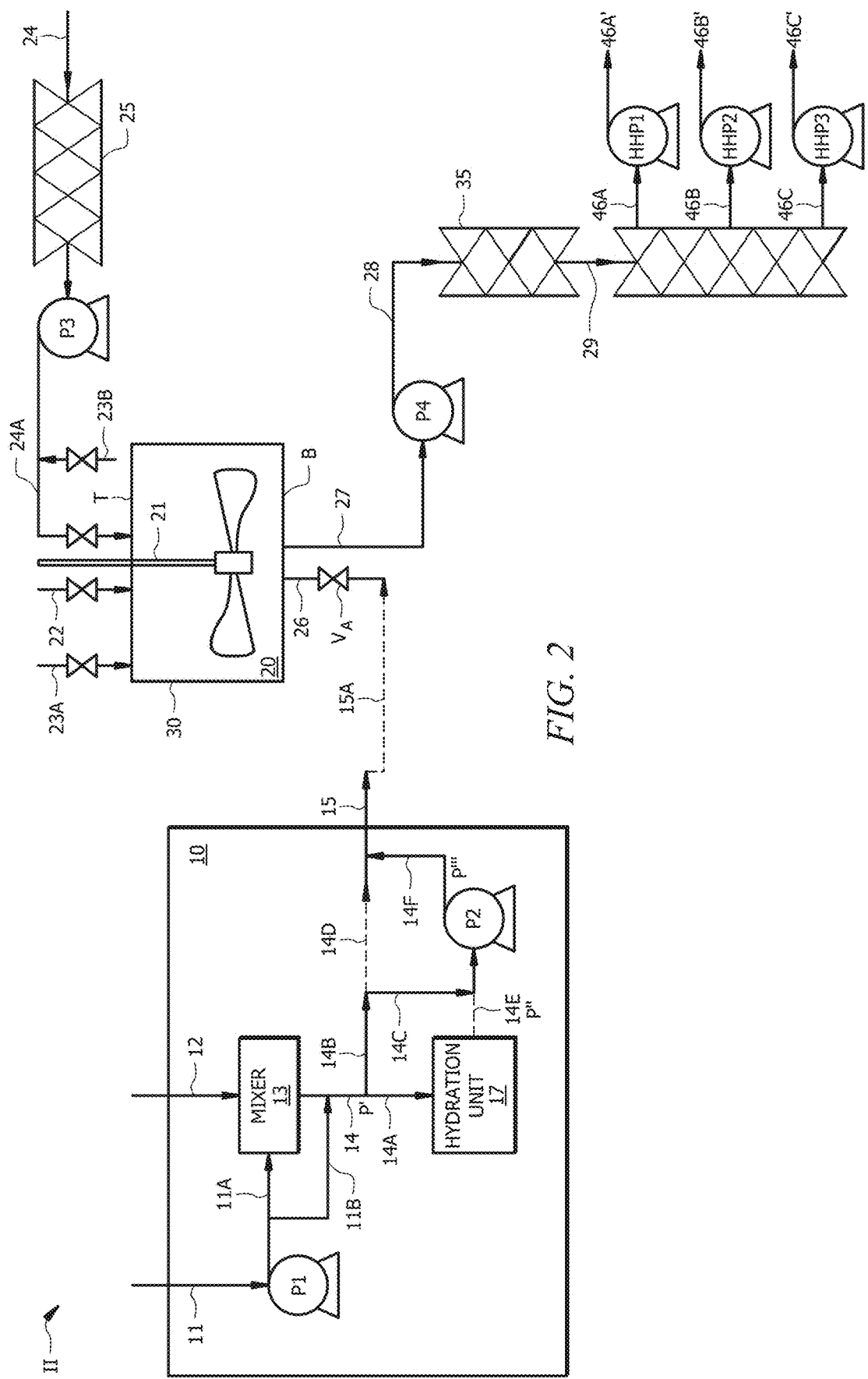
FIG. 2 is a schematic of a DFR/HVDFR system II, configured for introduction of DFR/HVDFR into a slurry blender (e.g., via a slurry blender drain line), according to embodiments of this disclosure.

In embodiments, such as depicted in FIG. 2, wherein the system of this disclosure comprises (i) a line fluidly connecting the DFR/HVDFR concentrate production apparatus 10 with the slurry blender, forming a slurry stream comprising DFR/HVDFR comprises: forming a DFR/HVDFR concentrate by combining DFR/HVDFR with an amount of water; adding the DFR/HVDFR concentrate into the slurry in the slurry blender at a point beneath an elevation at which solid material from solids inlet line contact the aqueous fluid (e.g., the slurry) in the slurry blender; and removing the slurry stream comprising DFR/HVDFR from the slurry blender. For example, with reference to FIG. 2, in embodiments, forming the slurry stream comprising DFR/HVDFR comprises forming a DFR/HVDFR concentrate in DFR/HVDFR concentrate line 15 by combining DFR/HVDFR with an amount of water, as detailed herein; adding the DFR/HVDFR concentrate into the slurry in the slurry blender 20; and removing the slurry stream comprising DFR/HVDFR from the slurry blender 20 via slurry blender discharge line 27. In such embodiments, forming the DFR/HVDFR concentrate can comprise forming the DFR/HVDFR at a pressure greater than a pressure of slurry blender 20. In embodiments, adding the DFR/HVDFR concentrate into the slurry in the slurry blender 20 comprises adding the DFR/HVDFR concentrate from first DFR/HVDFR concentrate line 15A via slurry blender drain 26 and valve $V_A$. In such embodiments, the DFR/HVDFR is primarily only subjected to shear (upstream of the HHP) in any pumps (e.g., first pump P1 and/or second pump P2) of DFR/HVDFR concentrate production unit 10 to which it is introduced, within slurry blender 20, and any pumps downstream of slurry blender 20 to which it is introduced. In embodiments, the DFR/HVDFR is subjected to shear in pre-gel discharge pump P2 and not in a pre-gel suction pump P1. Also, the DFR/HVDFR production unit 10 can, in such embodiments, be operable to provide a suitable pressure of the DFR/HVDFR concentrate for introduction into slurry blender 20 (i.e., greater than a pressure of slurry blender 20).

In embodiments, forming a slurry stream comprising DFR/HVDFR comprises: forming a DFR/HVDFR concentrate by combining DFR/HVDFR with an amount of water, as described herein; removing a slurry stream from the slurry blender; and adding the DFR/HVDFR concentrate into the slurry stream to provide the slurry stream comprising DFR/HVDFR. In such embodiments, forming the slurry stream comprising DFR/HVDFR comprises forming a DFR/HVDFR concentrate in DFR/HVDFR concentrate line 15 by combining DFR/HVDFR with an amount of water, and removing a slurry stream from slurry blender 20, as detailed herein, and adding the DFR/HVDFR concentrate from DFR/HVDFR concentrate line 15 into the slurry stream withdrawn from slurry blender 20 to provide the slurry stream comprising DFR/HVDFR. In such embodiments, the DFR/HVDFR is primarily only subjected to shear (upstream of the HHP) in any pumps (e.g., contact within pre-gel suction pump P1 and/or pre-gel blender discharge pump P2) of DFR/HVDFR concentrate production unit 10 and any pumps downstream of slurry blender 20 to which it is introduced. Also, the DFR/HVDFR production unit 10 can, in such embodiments, be operable to provide a suitable pressure of the DFR/HVDFR concentrate for introduction downstream of slurry blender 20 (i.e., greater than a pressure of a location to which the DFR/HVDFR concentrate is introduced, as described further hereinbelow). In some such embodiments, only a single pump (e.g., pre-gel suction pump P1) is utilized in DFR/HVDFR production unit 10. In other such embodiments, two pumps (e.g., pre-gel blender suction pump P1 and pre-gel blender discharge pump P2) are utilized in DFR/HVDFR production unit 10. In embodiments, the DFR/HVDFR is subjected to shear in pre-gel discharge pump P2 and not in a pre-gel suction pump P1.

In some embodiments comprising forming the slurry stream comprising DFR/HVDFR by: forming a DFR concentrate by combining DFR with an amount of water, removing a slurry stream from the slurry blender, and adding the DFR concentrate into the slurry stream to provide the slurry stream comprising DFR, removing the slurry stream from the slurry blender can comprise pumping the slurry stream from the slurry blender 20 to a slurry blender discharge manifold 35 via a slurry blender discharge pump P4 and can further comprise introducing the slurry stream from the slurry blender discharge manifold 35 into an HHP manifold 45.

Figure 3:
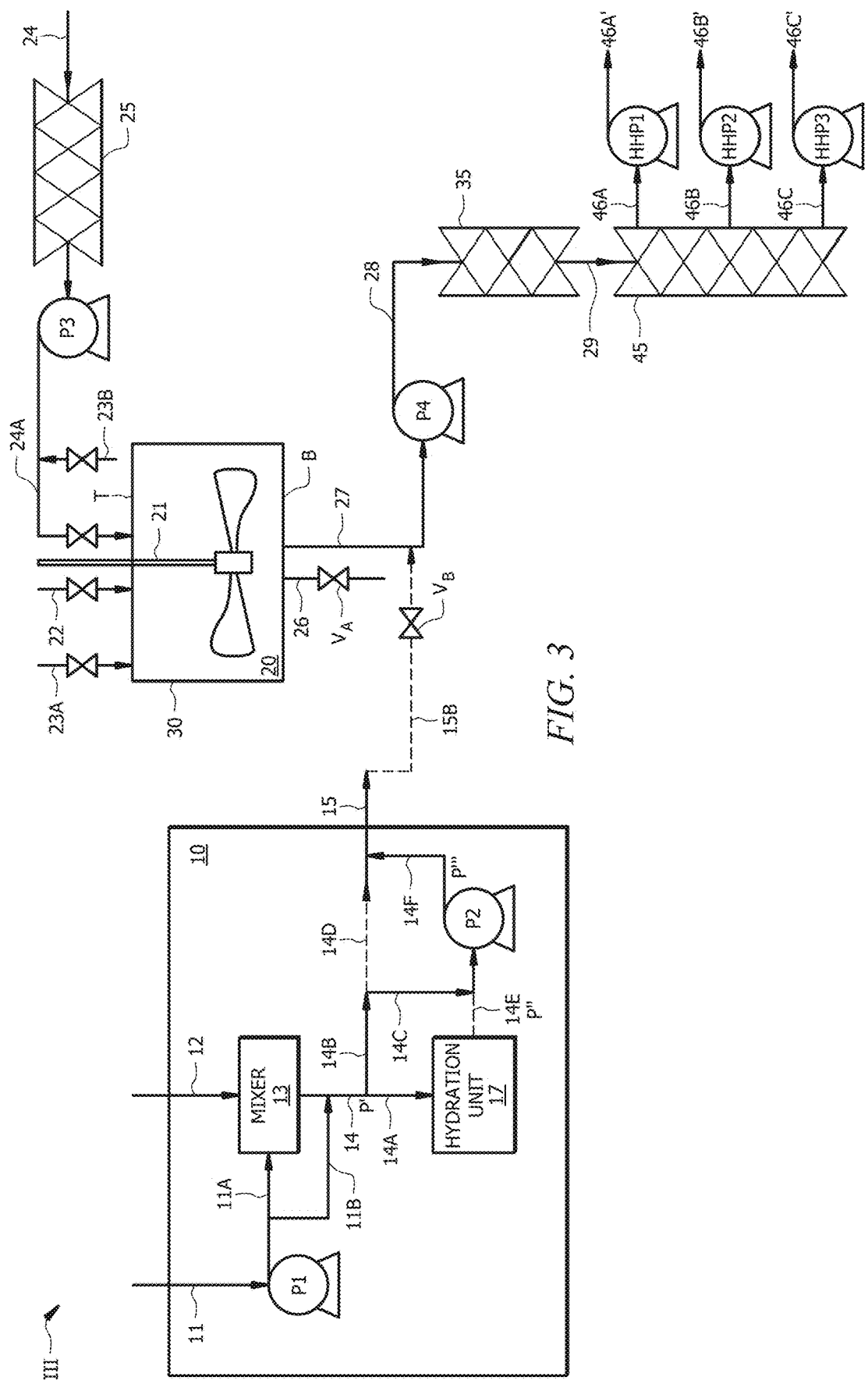
FIG. 3 is a schematic of a DFR/HVDFR system III, configured for introduction of DFR/HVDFR into a slurry blender discharge line upstream of a slurry blender discharge pump, according to embodiments of this disclosure.

In embodiments, such as depicted in FIG. 3, a system of this disclosure comprises (ii) a line fluidly connecting the DFR/HVDFR concentrate production apparatus with the slurry blender discharge line upstream of the slurry blender discharge pump, whereby the DFR/HVDFR concentrate is introduced into the slurry in the slurry blender discharge line to provide the slurry comprising DFR/HVDFR. In such embodiments, adding the DFR/HVDFR concentrate into the slurry stream to provide the slurry stream comprising DFR/HVDFR can comprise: adding the DFR/HVDFR concentrate from DFR/HVDFR concentrate line 15 into the slurry stream upstream of the slurry blender discharge pump P4 via second DFR/HVDFR concentrate line 15B. In such embodiments, the DFR/HVDFR is primarily only subjected to shear (upstream of HHP) in any pumps (e.g., pre-gel suction pump P1 and/or pre-gel blender discharge pump P2) of DFR/HVDFR production unit 10 and within slurry blender discharge pump P4. Also, the DFR/HVDFR production unit 10 can, in such embodiments, be operable to provide a pressure of the DFR/HVDFR in DFR/HVDFR concentrate line 15 and second DFR/HVDFR concentrate line 15B greater than a pressure of the slurry blender discharge line 27. In some such embodiments, only a single pump (e.g., pre-gel suction pump P1) is utilized in DFR/HVDFR production unit 10. In other such embodiments, two pumps (e.g., pre-gel blender suction pump P1 and pre-gel blender discharge pump P2) are utilized in DFR/HVDFR production unit 10. In embodiments, the DFR/HVDFR is subjected to shear in pre-gel discharge pump P2 and not in a pre-gel suction pump P1.

Figure 4:
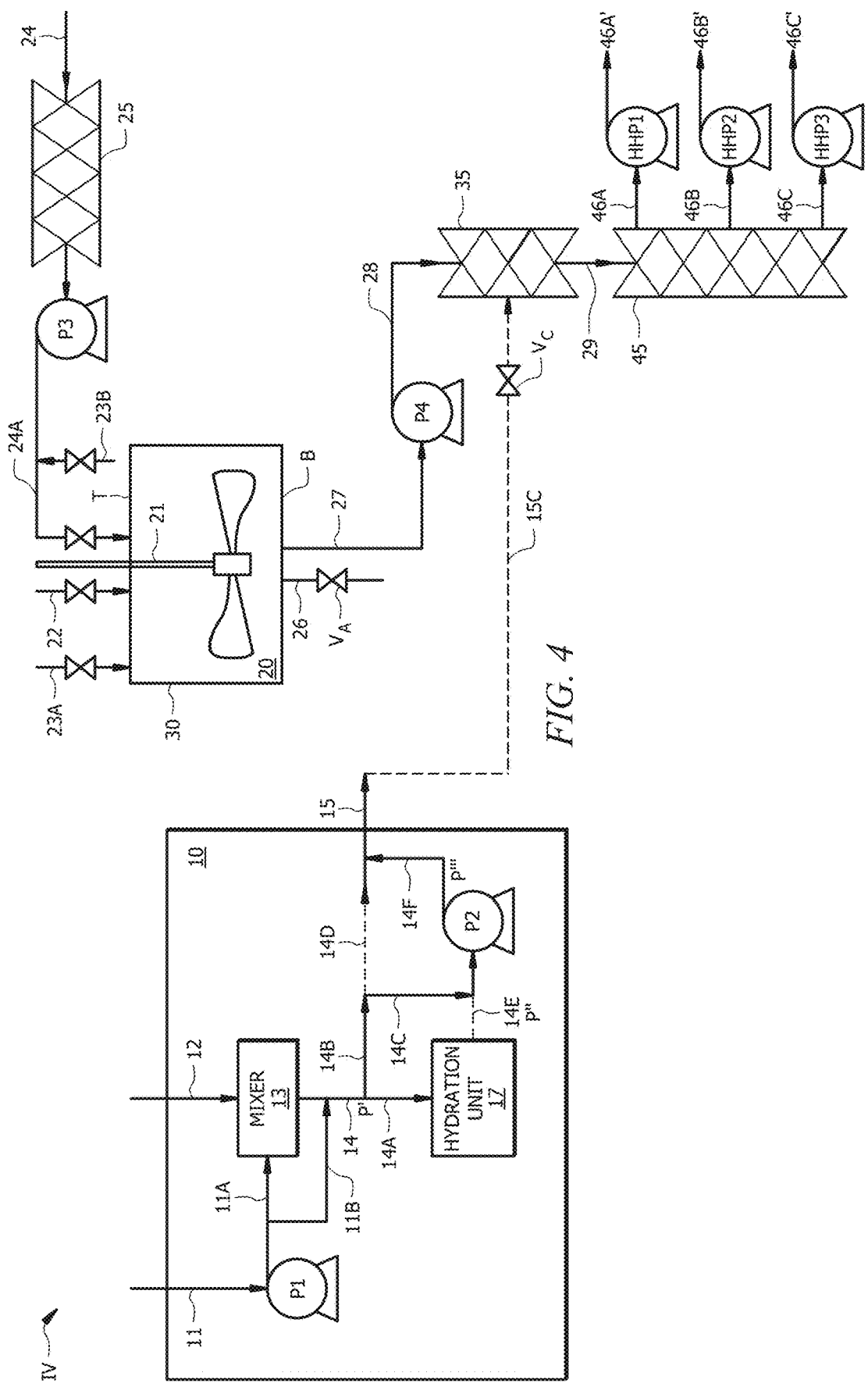
FIG. 4 is a schematic of a DFR/HVDFR system IV, configured for introduction of DFR/HVDFR into a slurry blender discharge line upstream of or into a slurry blender discharge manifold, according to embodiments of this disclosure.

In embodiments, such as depicted in FIG. 4, a system of this disclosure comprises (iii) a line fluidly connecting the DFR/HVDFR concentrate production apparatus with the slurry blender discharge line downstream of the slurry blender discharge pump and upstream of the slurry blender discharge manifold and/or into the slurry blender discharge manifold. In such embodiments, adding the DFR/HVDFR concentrate into the slurry stream to provide the slurry stream comprising DFR/HVDFR can comprise: adding the DFR/HVDFR concentrate from DFR/HVDFR concentrate line 15 into the slurry stream downstream of the slurry blender discharge pump P4 and upstream of and/or directly into the slurry blender discharge manifold 35 (e.g., via third DFR/HVDFR concentrate line 15C). In such embodiments, the DFR/HVDFR is primarily only subjected to shear (upstream of HHP) in any pumps (e.g., pre-gel suction pump P1 and/or pre-gel blender discharge pump P2) of DFR/HVDFR production unit 10 and slurry blender discharge pump P4. Also, the DFR/HVDFR production unit 10 can, in such embodiments, be operable to provide a pressure of the DFR/HVDFR concentrate in DFR/HVDFR concentrate line 15 and third DFR/HVDFR concentrate line 15C greater than a pressure of the slurry blender discharge pump outlet line 28 (in embodiments in which the DFR/HVDFR concentrate is added from third DFR/HVDFR concentrate line 15C into the slurry stream downstream of the slurry blender discharge pump P4 and upstream of the slurry blender discharge manifold 35) or the greater than a pressure of slurry blender discharge manifold 35 (in embodiments in which the DFR/HVDFR concentrate is added via third DFR/HVDFR concentrate line 15C directly into the slurry blender discharge manifold 35). In some such embodiments, only a single pump (e.g., pre-gel suction pump P1) is utilized in DFR/HVDFR production unit 10. In other such embodiments, two pumps (e.g., pre-gel blender suction pump P1 and pre-gel blender discharge pump P2) are utilized in DFR/HVDFR production unit 10. In embodiments, the DFR/HVDFR is subjected to shear in pre-gel discharge pump P2 and not in a pre-gel suction pump P1.

Figure 5:
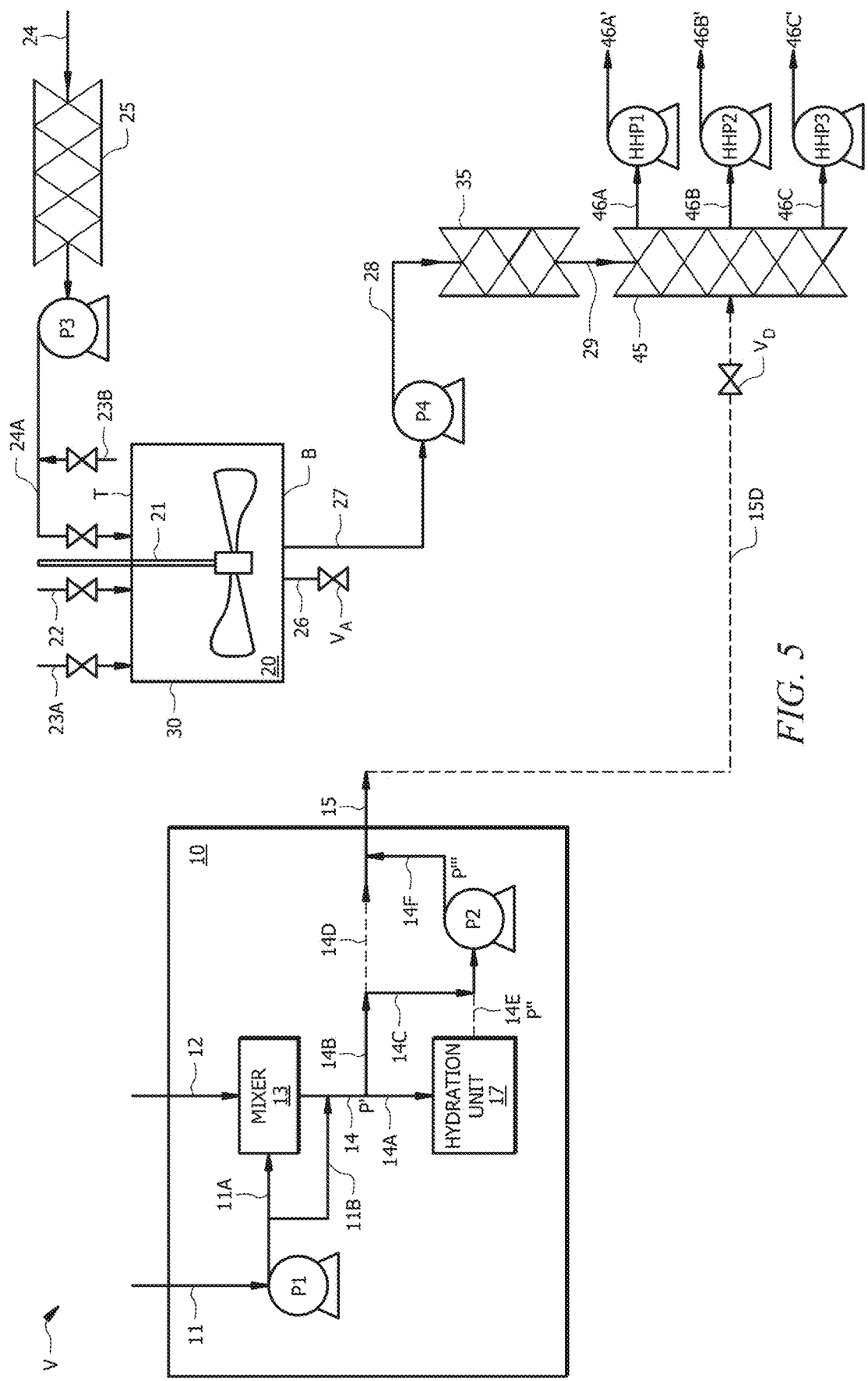
FIG. 5 is a schematic of a DFR/HVDFR system V, configured for introduction of DFR/HVDFR upstream of or into an HHP suction side discharge manifold, according to embodiments of this disclosure.

In embodiments, such as depicted in FIG. 5, a system of this disclosure comprises (iv) a line fluidly connecting the DFR/HVDFR concentrate production apparatus with the slurry blender discharge manifold outlet line downstream of the slurry blender discharge manifold and upstream of the HHP suction side discharge manifold and/or into the HHP suction side discharge manifold, whereby the DFR/HVDFR concentrate is introduced into the slurry in the slurry blender discharge manifold outlet line and/or the HHP manifold to provide the slurry comprising DFR/HVDFR. In such embodiments, adding the DFR/HVDFR concentrate into the slurry stream to provide the slurry stream comprising DFR/HVDFR can comprise: adding the DFR/HVDFR concentrate from DFR/HVDFR concentrate line 15 into the slurry stream downstream of the slurry discharge manifold 35 and upstream of and/or directly into the HHP suction side discharge manifold 45 (e.g., via fourth DFR/HVDFR concentrate line 15D). In embodiments, the DFR/HVDFR is primarily only subjected to shear in any pumps (e.g., pre-gel suction pump P1 and/or pre-gel blender discharge pump P2) of DFR/HVDFR concentrate production unit 10 and slurry blender discharge pump P4. Also, the DFR/HVDFR concentrate production unit 10 can, in such embodiments, be operable to provide a pressure of the DFR/HVDFR concentrate in DFR/HVDFR concentrate line 15 and fourth DFR/HVDFR concentrate line 15D greater than a pressure of the slurry blender discharge manifold outlet line 29 (in embodiments in which the DFR/HVDFR concentrate is added from fourth DFR/HVDFR concentrate line 15D into the slurry stream downstream of the slurry blender manifold 35 and upstream of the HHP manifold 45) or greater than a pressure of HHP suction side discharge manifold 45 (in embodiments in which the DFR/HVDFR concentrate is added from fourth DFR/HVDFR concentrate line 15D directly into the HHP suction side discharge manifold 45). In some such embodiments, only a single pump (e.g., pre-gel suction pump P1) is utilized in DFR/HVDFR production unit 10. In other such embodiments, two pumps (e.g., pre-gel blender suction pump P1 and pre-gel blender discharge pump P2) are utilized in DFR/HVDFR production unit 10. In embodiments, the DFR/HVDFR is subjected to shear in pre-gel discharge pump P2 and not in a pre-gel suction pump P1.

As noted hereinabove, in embodiments, a combination and/or a plurality of first DFR/HVDFR concentrate line 15A, second DFR/HVDFR concentrate line 15B, third DFR/HVDFR concentrate line 15C, and/or fourth DFR/HVDFR concentrate line 15D is utilized to introduce the DFR/HVDFR concentrate into the slurry. In embodiments, the DFR/HVDFR concentrate is not subjected to shear in slurry blender suction pump P3 utilized to introduce the aqueous fluid to the slurry blender 20, the slurry blender 20, or slurry blender discharge pump P4 utilized to pump slurry from the slurry blender 20 to slurry blender discharge manifold 35. In the embodiments of FIG. 1 through FIG. 5 (and FIG. 6, described further hereinbelow), the DFR/HVDFR is not subjected to shear in a slurry blender suction pump P3. In the embodiments of FIG. 2 through FIG. 5, the DFR/HVDFR is not subjected to shear in a slurry blender suction pump P3 or in slurry blender 20. In the embodiments of FIG. 4 and FIG. 5, the DFR/HVDFR is not subjected to shear in a slurry blender suction pump P3, in slurry blender 20, or in slurry blender discharge pump P4.

In some embodiments comprising adding the DFR/HVDFR concentrate from DFR/HVDFR concentrate line 15 into the slurry stream upstream of the slurry blender discharge pump P4 via second DFR/HVDFR concentrate line 15B, the DFR/HVDFR concentrate can be injected into the slurry stream at a pressure greater than the suction pressure of the slurry blender discharge pump P4. In some embodiments comprising adding the DFR/HVDFR concentrate from DFR/HVDFR concentrate line 15 into the slurry stream downstream of the slurry blender discharge pump P4 and upstream of and/or directly into the slurry blender discharge manifold 35 (e.g., via third DFR/HVDFR concentrate line 15C), the DFR/HVDFR concentrate can be added to the slurry stream at a pressure greater than the pressure of the slurry blender discharge manifold 35. In some embodiments comprising adding the DFR/HVDFR concentrate from DFR/HVDFR concentrate line 15 into the slurry stream downstream of the slurry discharge manifold 35 and upstream of and/or directly into the HHP suction side discharge manifold 45 (e.g., via fourth DFR/HVDFR concentrate line 15D), the DFR/HVDFR concentrate can be added to the slurry stream at a pressure greater than the pressure of the slurry blender discharge manifold 35. In some embodiments, the DFR/HVDFR concentrate is added to the slurry stream partly by adding the DFR/HVDFR concentrate from DFR/HVDFR concentrate line 15 into the slurry stream upstream of the slurry blender discharge pump P4 via second DFR/HVDFR concentrate line 15B, wherein the DFR/HVDFR concentrate can be injected into the slurry stream at a pressure greater than the suction pressure of the slurry blender discharge pump P4 and/or at a pressure greater than the slurry blender suction manifold 35; and partly by adding the DFR/HVDFR concentrate from DFR/HVDFR concentrate line 15 into the slurry stream downstream of the slurry blender discharge pump P4 and upstream of and/or directly into the slurry blender discharge manifold 35 (e.g., via third DFR/HVDFR concentrate line 15C), wherein the DFR/HVDFR concentrate can be added to the slurry stream at a pressure greater than the pressure of the slurry blender discharge manifold 35; and/or adding the DFR/HVDFR concentrate from DFR/HVDFR concentrate line 15 into the slurry stream downstream of the slurry discharge manifold 35 and upstream of and/or directly into the HHP suction side discharge manifold 45 (e.g., via fourth DFR/HVDFR concentrate line 15D), wherein the DFR/HVDFR concentrate can be added to the slurry stream at a pressure greater than the pressure of the slurry blender discharge manifold 35.

In embodiments comprising adding the DFR/HVDFR concentrate into the slurry stream downstream of the slurry blender discharge pump P4 and upstream of and/or directly into the slurry blender discharge manifold 35, and/or adding the DFR/HVDFR concentrate into the slurry stream downstream of the slurry blender discharge manifold 35 and upstream of and/or directly into the HHP suction side discharge manifold 45, the DFR/HVDFR concentrate is not subjected to pumping shear associated with slurry blender suction pump P3 configured to introduce the aqueous-based fluid into the slurry blender 20, pumping shear associated with the slurry blender discharge pump P4, or shear associated with an agitator 21 of the slurry blender 20.

Figure 6:
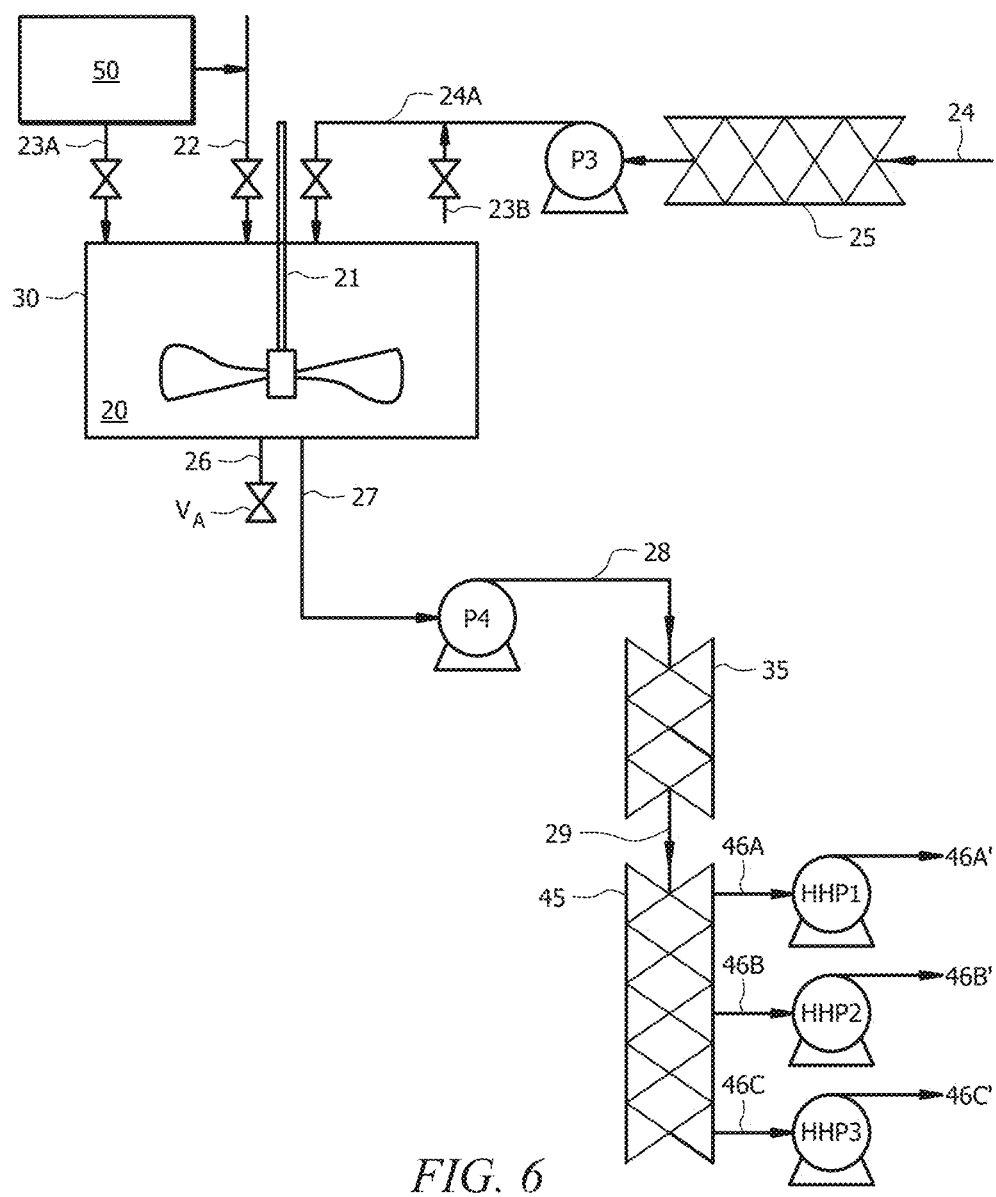
FIG. 6 is a schematic of a DFR/HVDFR system VI, configured for introduction of dry, powder DFR/HVDFR into a slurry blender, separately or in combination with a proppant, according to embodiments of this disclosure.

As noted above, in embodiments, forming a slurry stream comprising DFR/HVDFR comprises: introducing DFR/HVDFR, in dry powder form, into the slurry blender and removing the slurry stream comprising DFR/HVDFR from the slurry blender. For example, as depicted in FIG. 6, forming the slurry stream comprising DFR/HVDFR can comprise introducing DFR/HVDFR, in dry powder form, into the slurry blender 20 via dry, powdered DFR/HVDFR storage unit 50 and removing the slurry stream comprising DFR/HVDFR from the slurry blender 20 via slurry blender outlet line 27.

As noted hereinabove, forming the slurry stream can be effected via a combination of: forming a DFR/HVDFR concentrate by combining DFR/HVDFR with an amount of water; adding the DFR/HVDFR concentrate into the slurry in the slurry blender at a point beneath an elevation at which solid material from solids inlet line contact the aqueous fluid (e.g., the slurry) in slurry blender, and removing the slurry stream comprising DFR/HVDFR from the slurry blender; forming a DFR/HVDFR concentrate by combining DFR/HVDFR with an amount of water, removing a slurry stream from the slurry blender, and adding the DFR/HVDFR concentrate into the slurry stream to provide the slurry stream comprising DFR/HVDFR; and/or introducing DFR/HVDFR, in dry powder form, into the slurry blender and removing the slurry stream comprising DFR/HVDFR from the slurry blender.

In embodiments, introducing the slurry stream comprising DFR/HVDFR into the formation comprises pumping the slurry stream or the slurry stream comprising DFR/HVDFR from the slurry blender 20 to the slurry blender discharge manifold 35 via the slurry bender discharge pump P4, and pumping the slurry stream comprising DFR/HVDFR from the slurry blender discharge manifold 35 into the formation via one or more high horsepower pumps (HHP) (e.g., HHP1, HHP2, HHP3) associated with HHP suction side discharge manifold 45.

In embodiments, the one or more HHP comprise positive displacement pumps. In embodiments, the one or more HHP comprise sequential multistage pumps. The one or more HHP can operate during the pumping of the slurry stream comprising DFR/HVDFR at a pressure of greater than or equal to about 3,000 psi, 5,000 psi, 10,000 psi, 20,000 psi, 30,000 psi, 40,000 psi, or 50,000 psi, in embodiments. In embodiments, (each or the combination of) the one or more HHP operate during the pumping of the slurry stream comprising DFR/HVDFR at a volumetric flow rate of greater than or equal to about greater than or equal to about 3, 6, 20, 50, 80, 120 or 150 barrels per minute (BPM), or in a range of from about 1 to about 150, from about 50 to about 120, or from about 3 to about 150 BPM.

Figure 7:
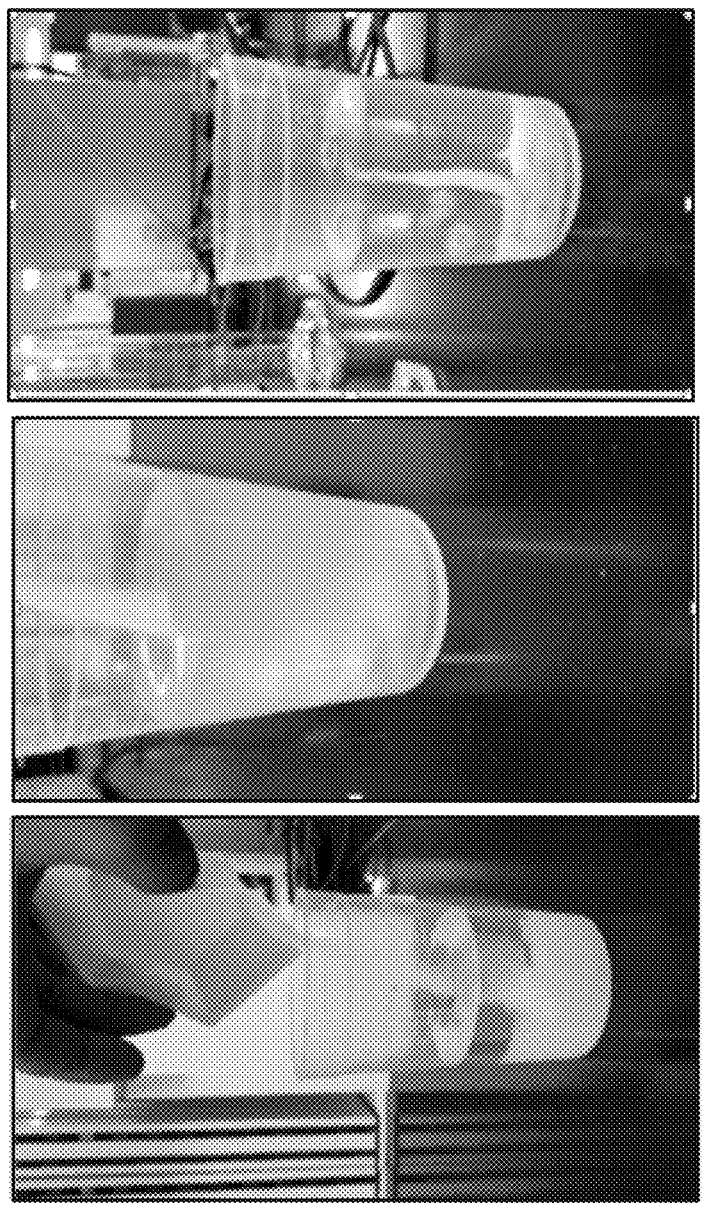
FIG. 7A depicts the addition of proppant into water.
FIG. 7B depicts the addition of proppant into 35 $lb_m$/1,000 gal guar linear gel.
FIG. 7C depicts the addition of proppant into 9 $lb_m$/1,000 gal HVDFR.

As described hereinabove, in embodiments, the DFR/VDFR is mixed to make a DFR/HVDFR concentrate on-the-fly, for example, by using a pre-gel blending unit. As shown in FIG. 7A, which depicts the addition of proppant into water; FIG. 7B, which depicts the addition of proppant into 35 $lb_m$/1,000 gal guar linear gel; and FIG. 7C, which depicts the addition of proppant into 9 $lb_m$/1,000 gal HVDFR, and as discussed herein, the addition of proppant into DFR/HVDFR and water (e.g., as depicted in FIG. 7C) results in air entrainment by the HVDFR/DFR, which degree of air entrainment is not seen via the addition of proppant to water in the absence of DFR/HVDFR (e.g., as depicted in FIG. 7A) or to linear guar gels (e.g., as depicted in FIG. 7B) commonly used in fracturing operations. Accordingly, according to embodiments of this disclosure, DFR/HVDFR is added, by way of a DFR/HVDFR concentrate, downstream from a location where proppant is added to form a slurry, such that air entrainment is mitigated.

Features and Potential Advantages

Those of ordinary skill in the art with the benefit of the present disclosure will readily appreciate various benefits that may be realized by the present disclosure. For instance, in embodiments, the herein disclosed system and method provide for increased efficiency of a slurry blender discharge pump P4 and/or increased viscosity of a slurry containing DFR/HVDFR such that a higher level (e.g., density) of solids (e.g., proppant) can be carried thereby.

Current liquid FRs are inefficiently delivered to the field, resulting in a higher total cost of use. For example, a road legal delivery of liquid FR is about 4000 gallons, which contain about 12,000 pounds (lb) of polymer, as one gallon of liquid FR typically contains about 3 lb of active polymer. Thus, a road legal delivery of liquid FR typically comprises about 12,000 lb of polymer/delivery. In contrast, a road legal delivery of DFR/HVDFR is 35,000 lbs, which is approximately three times as much as a liquid delivery. Accordingly, utilizing a DFR/HVDFR as per the herein disclosed system and method can result in minimizing logistics cost and time, which can thus lead to higher margins latitude, which may enable higher market share and/or higher profit margins.

EXAMPLES

Example 1: Discharge Manifold Method of FIG. 5 (and FIG. 1, 15D)

In embodiments, the DFR/HVDFR concentrate can be injected into the discharge manifold 35 of the downhole slurry blender 20. By utilizing this "discharge manifold" method, the number of shear points can be dramatically decreased. As noted hereinabove, conventional methods subject the DFR/HVDFR containing fluid to four points of shear prior to the HHP. These conventional points of shear include contact with the pre-gel centrifugal pump (e.g., pre-gel discharge pump P2), contact with the slurry blender suction centrifugal pump (e.g., slurry blender suction pump P3), contact with the agitator (e.g., agitator 21) of the slurry blender 20, and contact with the slurry blender discharge centrifugal pump (e.g., slurry blender discharge pump P4). With the discharge manifold method described herein, the DFR/HVDFR containing fluid (i.e., the DFR/HVDFR concentrate) contacts only one primary point of shear prior to the HHP. This single point of shear is contact with the pre-gel blender discharge pump P2.

Modified Rig-Up

Figure 8:
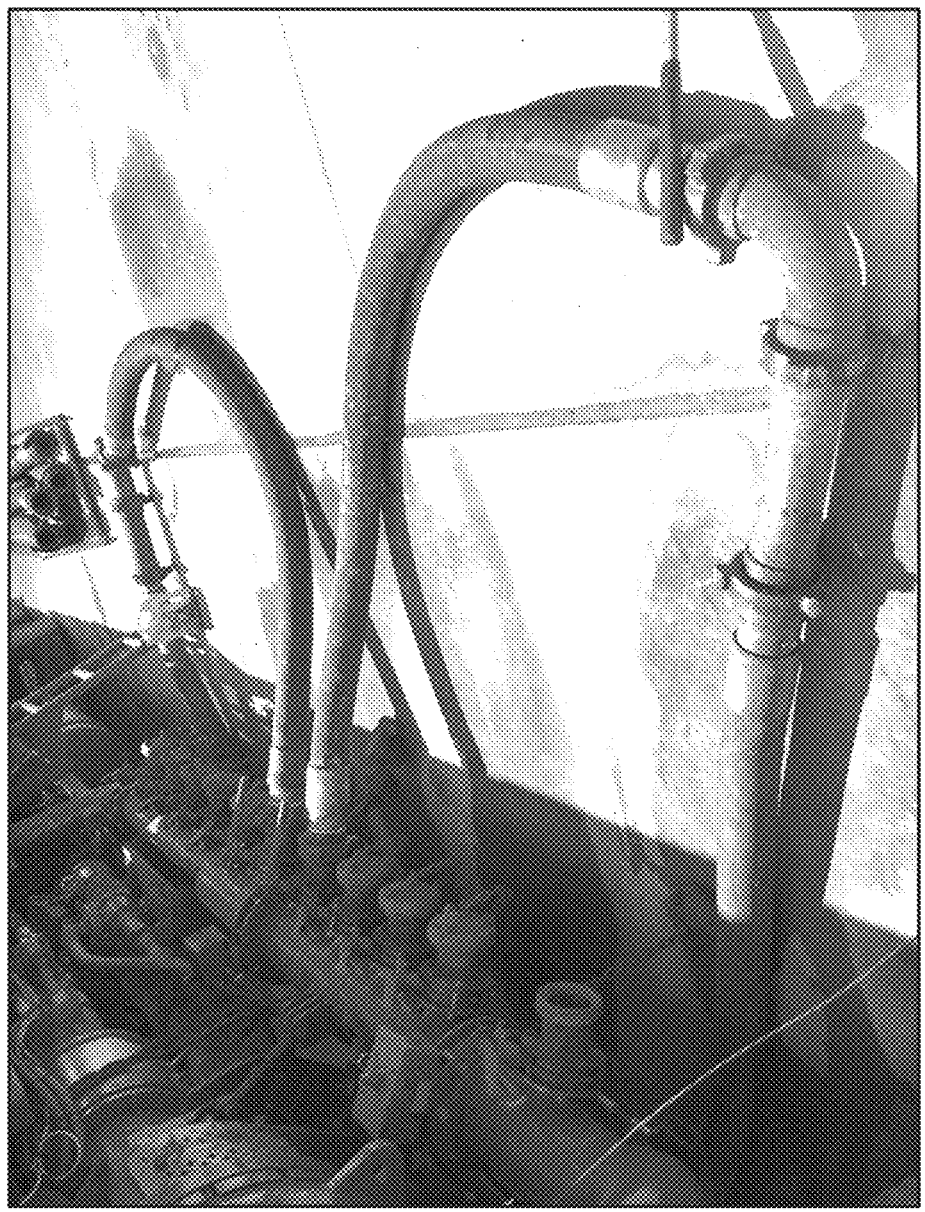
FIG. 8 depicts the modified rig-up of Example 1.

A set of experiments were performed using the modified injection method described with reference to FIG. 4 (and FIG. 1 comprising third DFR/HVDFR concentrate line 15C). A fluid was pumped from the pre-gel blender unit 10 into the slurry blender discharge manifold 35. The slurry blender discharge pump P4 was set at 80 psi and 80 barrels per minute (bpm). The pre-gel blender discharge pump P2 was set at 90 psi, such that the discharge pressure of the pre-gel blending unit 10 overcame the discharge pressure of the slurry blending discharge pump P4 to attain the design DFR/HVDFR concentrate rate. FIG. 8 shows the rig-up that was performed in this Example.

Figure 9:
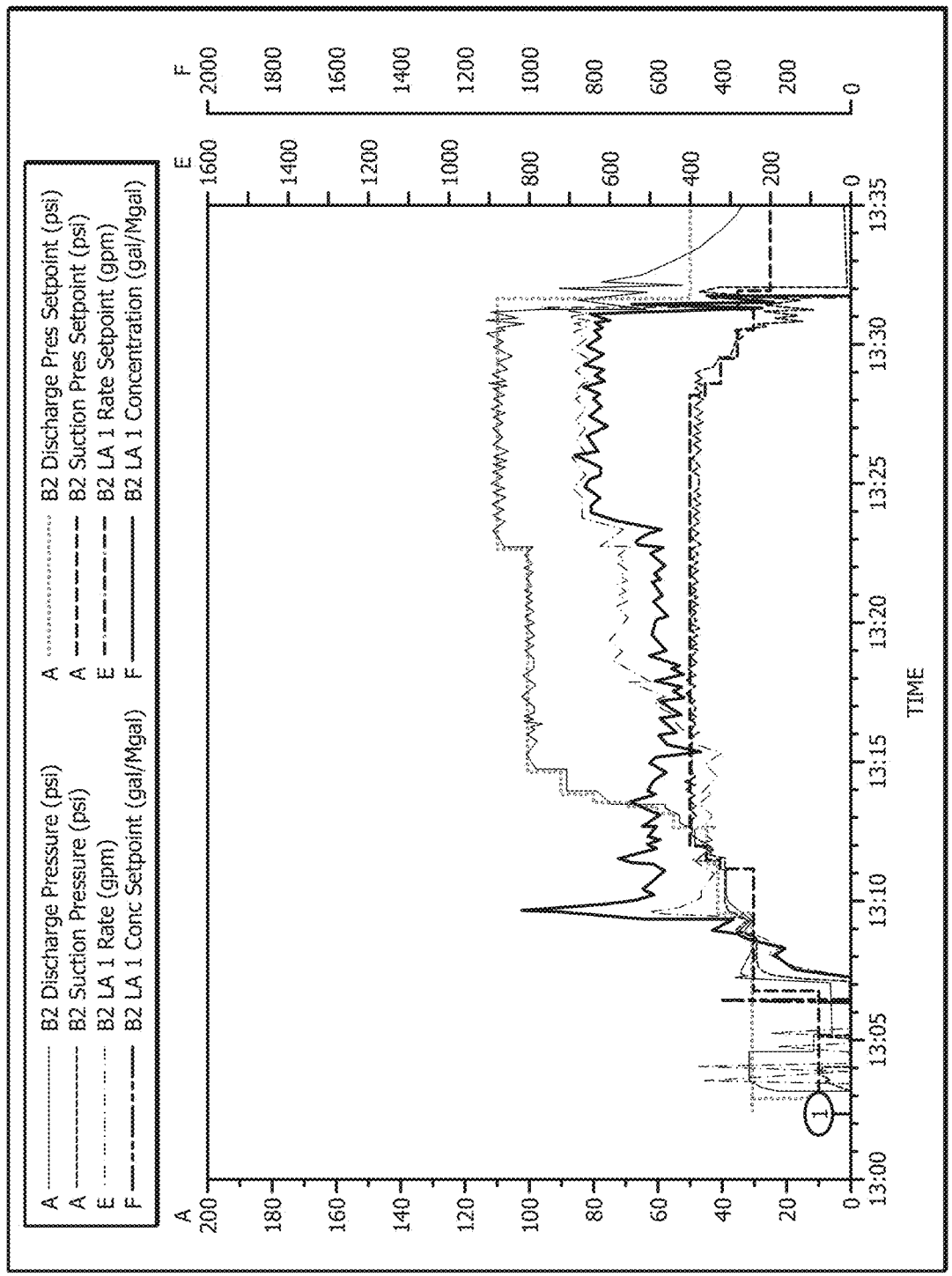
FIG. 9 is a plot discharge pressures and rates of the pre-gel blender unit of the modified rig-up of Example 1, (e.g., systems II, III, IV, and V)
Figure 10A:
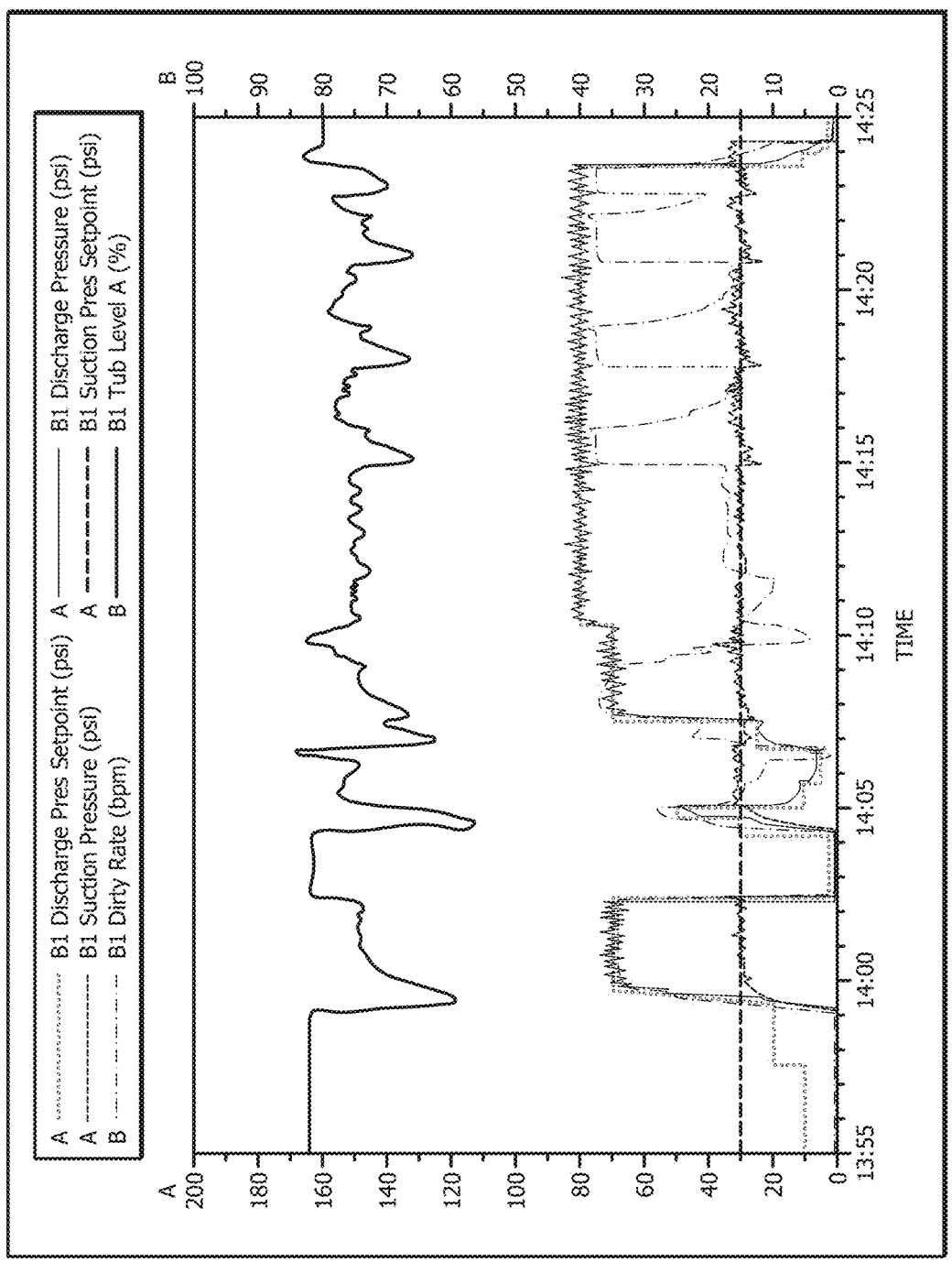
FIG. 10A is a plot discharge pressures and rates of the slurry blender of the modified rig-up of Example 1, (e.g., systems IV and V)
Figure 10B:
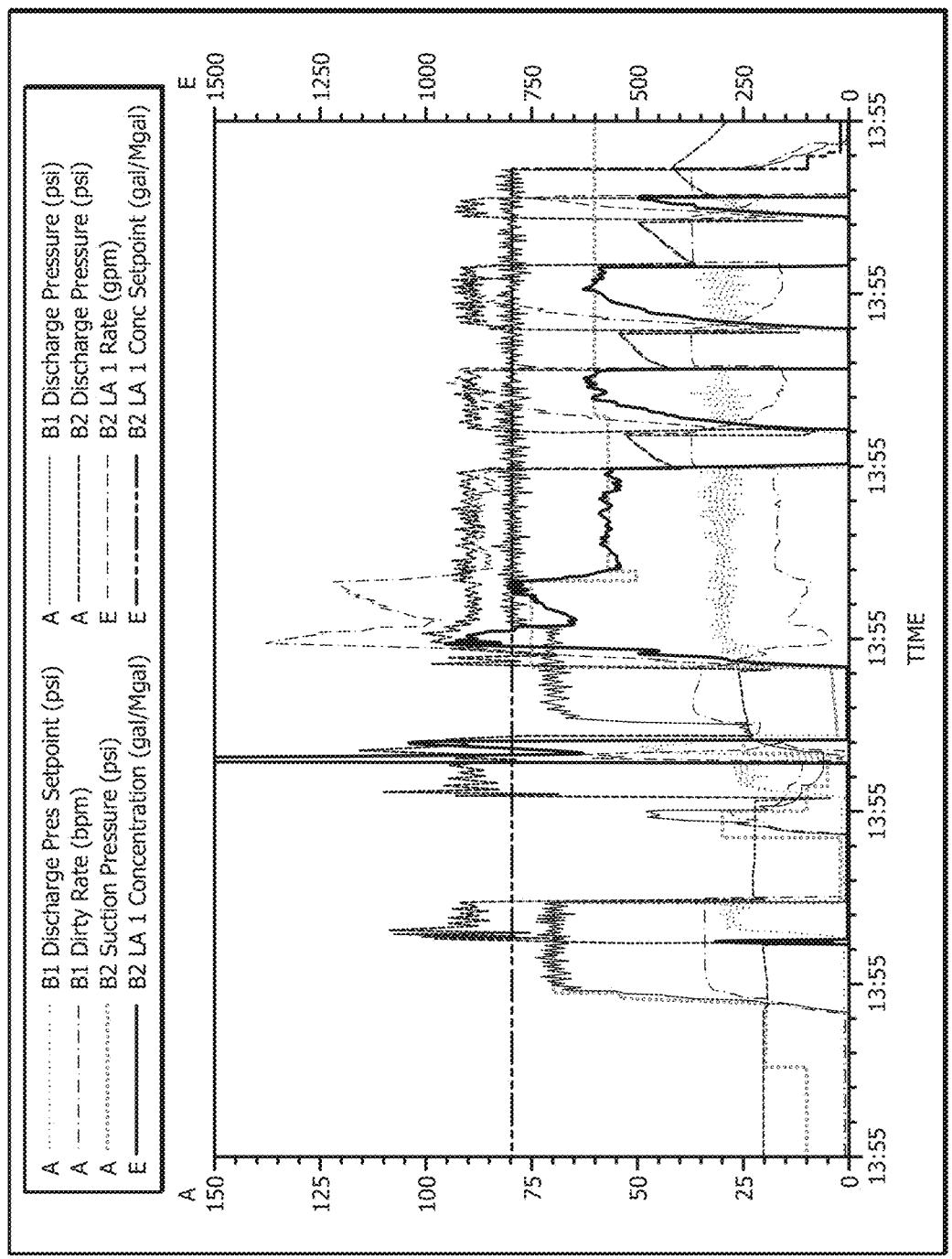
FIG. 10B is a combined plot of the discharge pressures and rates of both the pre-gel blender discharge pump P2 and the slurry blender discharge pump P4 of Example 1.

FIG. 9 is a plot of the discharge pressures and rates of the pre-gel blender discharge pump P2 of this Example 1; and FIG. 10A is a plot of the discharge pressures and rates of the slurry blender discharge pump P4 of this Example 1; and FIG. 10B is a combined plot of the discharge pressures and rates of both the pre-gel blender discharge pump P2 and the slurry blender discharge pump P4 of this Example 1. From the results in FIG. 9, FIG. 10A and FIG. 10B, it is apparent that the pre-gel blender discharge pump P2 (B2 Discharge pressure) performs as designed. Pre-gel blender discharge pump P2 was able to overcome the discharge pressure of the slurry blender discharge pump P4 (B1 Discharge Pressure) and pump at the assigned set point. No significant losses or fluctuations in rate were observed. Additionally, the discharge pressure of the slurry blender discharge pump P4 does not see any fluctuations or losses in rate, indicating that this rig-up method does not negatively affect the equipment.

Comparative Conventional Rig-Up

A run with a comparative conventional rig-up was performed to compare the results seen above. The DFR/HVDFR concentrate was injected in the conventional location, at the suction manifold 25 of the slurry blender suction pump P3.

Figure 11:
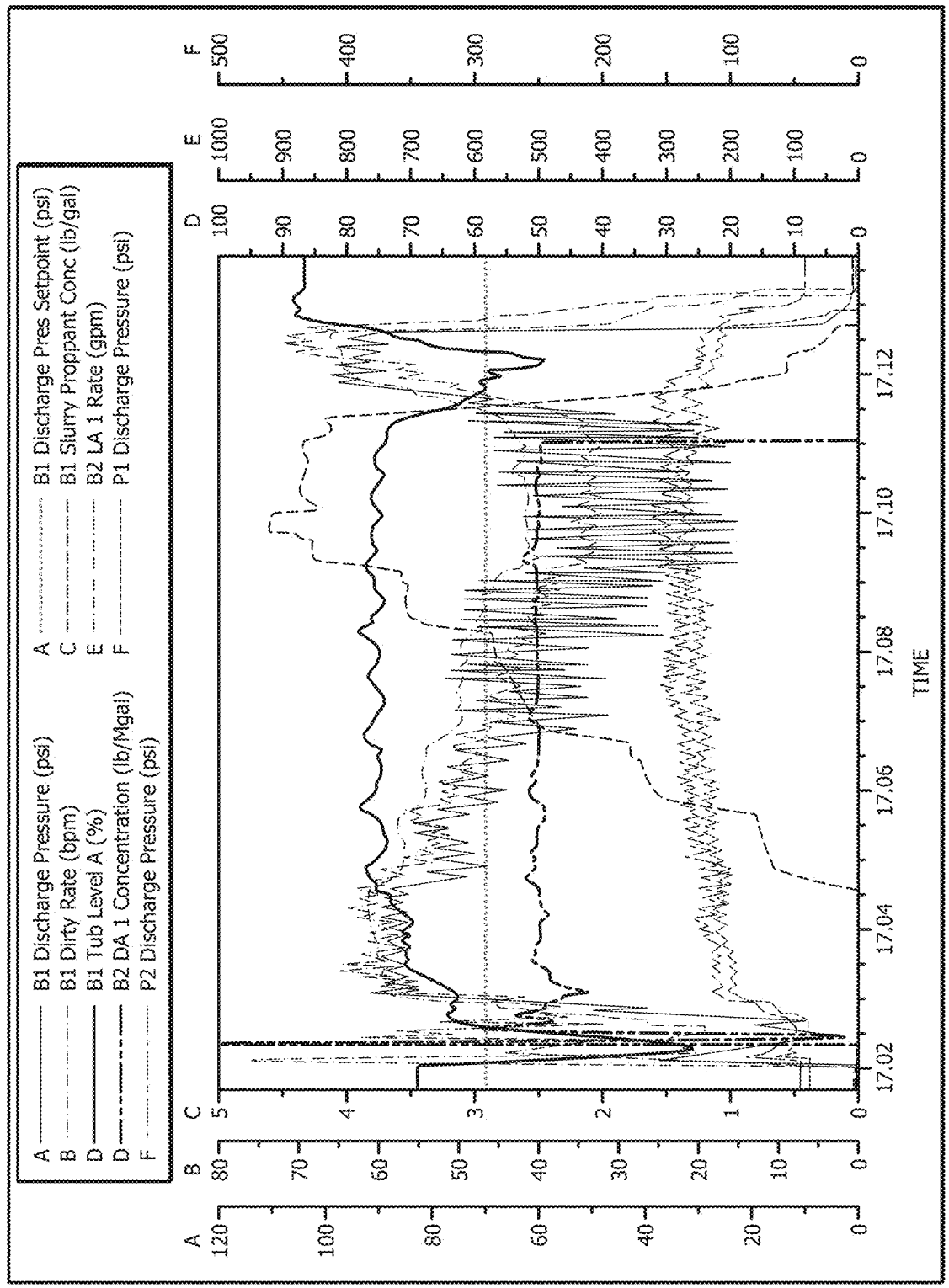
FIG. 11 is a plot of the discharge pressures and rates of the slurry blender of a conventional, comparison rig-up of Example 1 with DFR/HVDFR concentrate injection upstream of or at the fluid/sand addition interface (that is, with DFR/HVDFR concentrate added into the top of the blender sand mixing tub/vessel together with the proppant)

The slurry blender control software was set to provide the same discharge rate, 80 bpm. However, this rate was not achieved due to the large air entrainment that was introduced by the conventional method. FIG. 11 is a plot of the discharge pressures and rates of the slurry blender discharge pump P4 of the conventional, comparison rig-up of this Example 1. As seen in FIG. 11, the discharge pressure and rate exhibit a large amount of fluctuation and losses as proppant is introduced into the slurry blender 20.

Example 2: Slurry Drain Valve Method of FIG. 2 (and FIG. 1, 15A)

According to other embodiments of this disclosure, the DFR/HVDFR bypasses the hydration tank 17 of the pre-gel blending unit 10 and the DFR/HVDFR concentrate is injected into the fluid stream again at a point downstream of the point of sand/proppant addition. In embodiments, the DFR/HVDFR can be added from the bottom of and near the fluid exit of the slurry blender 20 at a point which the proppant is already wetted by the fluid and air has escaped from the fluid, via the blender tub drain 26 and blender tub drain valve $V_A$. Such a "drain valve" embodiment is depicted in FIG. 2 (and FIG. 1 comprising first DFR/HVDFR concentrate line 15A).

Drain Valve Rig-Up

Figure 12:
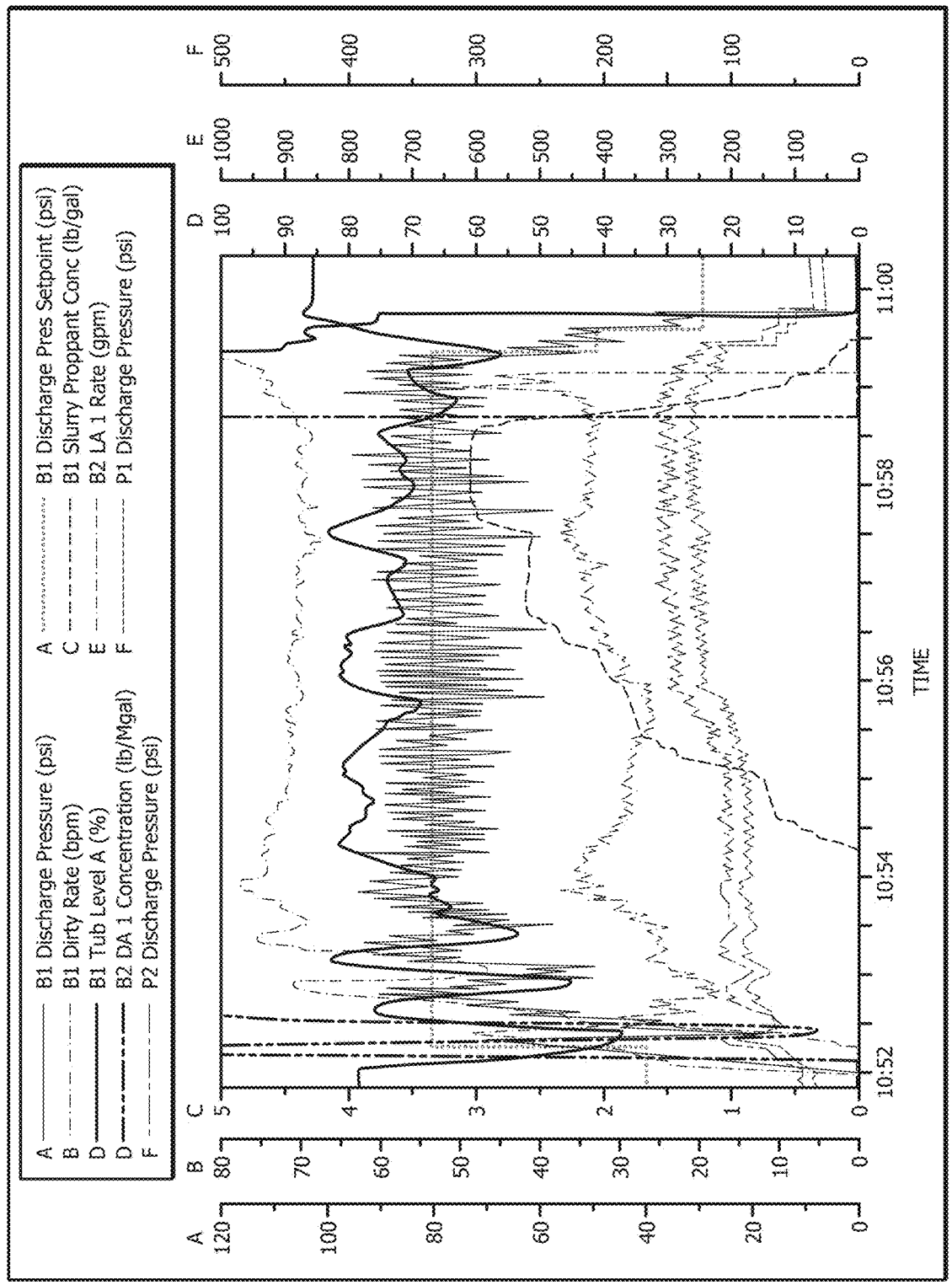
FIG. 12 is a plot of the discharge pressures and rates of the drain valve modified rig-up of Example 2.

A run with such a drain valve rig-up was performed in this Example 2. The DFR/HVDFR concentrate was injected into the drain valve $V_A$ of slurry blender drain line 26. FIG. 12 is a plot of the discharge pressures and rates of the drain valve modified rig-up of Example 2. Here, the discharge pressure of the slurry blender discharge pump P4 exhibits less variation than the comparative, conventional method (see Example 1 and FIG. 10). Additionally, there is less variation to the discharge rate of the slurry blender discharge pump P4. Finally, as the fluid does not go through the slurry blender suction pump P3, the fluid goes through one less point of shear, leading to a higher final slurry viscosity.

Example 3

In other embodiments of this disclosure, described hereinabove, dry (i.e., powdered) FR material is added directly to the frac blender mixing tub (e.g., slurry blender 20) at the same point of proppant (e.g., sand) addition to the process fluid. In this embodiment, both dry FR (dry DFR/HVDFR) and sand/proppant can be added via free fall through air into the process fluid. This process alternative is enabled for successful use by using a dry FR material whose activity development timing is of the fast acting development rate type dry FR such that: air entrained into the fluid when the sand/proppant enters the process fluid in the slurry blender 20 can escape before the activity development of the dry FR, polymer, VES or fluid rheology modifier is able to change the process stream fluid to the extent that the change can cause mixing and pumping equipment to function improperly; and the activity development rate is such that that desired resulting process fluid properties are developed prior to the properties being required to enable the desired application process outcome.

The Examples illustrate how the herein disclosed systems and methods for mixing and introduction (e.g., injection) of DFR/HVDFR allow for blending DFR/HVDFR (e.g., dry polymer friction reducer, such as for stimulation treatments) while using full scale equipment, polymer add rate and fluid flow rates.

ADDITIONAL DISCLOSURE

The following are non-limiting, specific embodiments in accordance with the present disclosure:

Embodiment A: A method of placing a slurry stream comprising dry friction reducer (DFR) into a subterranean formation penetrated by a wellbore, the method comprising: forming a slurry comprising an aqueous-based fluid and a proppant, wherein forming the slurry comprises introducing a dry material comprising the proppant or a dry additive and the aqueous-based fluid into a slurry blender; forming a slurry stream comprising DFR by: (a) forming a DFR concentrate by combining DFR with an amount of water; adding the DFR concentrate into the slurry in the slurry blender, whereby the DFR concentrate is introduced into a location within the slurry blender distant a location at which the dry material is added thereto; and removing the slurry stream comprising DFR from the slurry blender; (b) forming a DFR concentrate by combining DFR with an amount of water; removing a slurry stream from the slurry blender; and adding the DFR concentrate into the slurry stream to provide the slurry stream comprising DFR; (c) introducing DFR, in dry powder form, into the slurry blender and removing the slurry stream comprising DFR from the slurry blender; or (d) a combination of (a), (b), and/or (c); and introducing the slurry stream comprising DFR into the formation via the wellbore.

Embodiment B: The method of Embodiment A, comprising (b), wherein removing the slurry stream from the slurry blender comprises pumping the slurry stream from the slurry blender to a slurry blender discharge manifold via a slurry blender discharge pump and introducing the slurry stream from the slurry blender discharge manifold into an HHP manifold, and wherein adding the DFR concentrate into the slurry stream to provide the slurry stream comprising DFR comprises (i) adding the DFR concentrate into the slurry stream upstream of the slurry blender discharge pump, (ii) adding the DFR concentrate into the slurry stream downstream of the slurry blender discharge pump and upstream of and/or directly into the slurry blender discharge manifold, and/or (iii) adding the DFR concentrate into the slurry stream in downstream of the slurry discharge manifold and upstream of or directly into the HHP manifold.

Embodiment C: The method of Embodiment B: comprising (i), wherein the DFR concentrate is injected into the slurry stream at a pressure greater than the slurry blender discharge pump suction pressure; comprising (ii), wherein the DFR concentrate is added to the slurry stream at a pressure greater than the pressure of the slurry blender discharge manifold; comprising (iii), wherein the DFR concentrate is added to the slurry stream at a pressure greater than the pressure of the slurry blender discharge manifold; and/or (iv) wherein the DFR concentrate is added to the slurry stream partly by (i) and/or at a pressure greater than the slurry blender suction manifold and partly by (ii) and/or (iii).

Embodiment D: The method of any of Embodiment A or Embodiment B comprising (ii) adding the DFR concentrate into the slurry stream downstream of the slurry blender discharge pump and upstream of and/or directly into the slurry blender discharge manifold, and/or (iii) adding the DFR concentrate into the slurry stream in downstream of the slurry discharge manifold and upstream of or directly into the HHP manifold, such that the DFR concentrate is not subjected to pumping shear associated with a slurry blender suction pump configured to introduce the aqueous-based fluid into the slurry blender, pumping shear associated with the slurry blender discharge pump, or shear associated with an agitator of the slurry blender.

Embodiment E: The method of any of Embodiment A through Embodiment D, wherein the DFR is a high viscosity dry friction reducer (HVDFR) defined as a DFR that comprises a fluid which lowers the particle critical sedimentation velocity of the slurry.

Embodiment F: The method of any of Embodiment A through Embodiment E, wherein the DFR is a fast acting friction reducer.

Embodiment G: The method of any of Embodiment A through Embodiment F, wherein the DFR is a fast acting friction reducer which achieves its active function in a time interval of less than or equal to (e.g., less than 60 seconds).

Embodiment H: The method of any of Embodiment A through Embodiment G, wherein the DFR is a fast acting friction reducer which achieves 80 percent or more of its ultimate fluid friction reduction effect in a time interval of less than or equal to 60 seconds.

Embodiment I: The method of any of Embodiment A through Embodiment H, wherein the DFR is a fast acting friction reducer which achieves 80 percent or more of its ultimate fluid viscosifying effect in a time interval of less than or equal to 60 seconds.

Embodiment J: The method of any of Embodiment A through Embodiment I, wherein the DFR is a solid material at ambient temperature and pressure.

Embodiment K: The method of any of Embodiment A through Embodiment J, wherein the DFR is an HVDFR comprising an associative entity capable of forming extended structures in a fluid.

Embodiment L: The method of any of Embodiment A through Embodiment K, wherein the HVDFR comprises a polymer.

Embodiment M: The method of any of Embodiment A through Embodiment L, wherein the HVDFR comprises polyacrylamide.

Embodiment N: The method of any of Embodiment A through Embodiment M, wherein the proppant comprises sand, treated sand, ceramic materials, man made particles, particles comprising a polymeric material, particles of material sourced from flora (plant kingdom), particles comprising a composite, particles comprising a primary structural material and a secondary added material, or a combination thereof.

Embodiment O: The method of any of Embodiment A through Embodiment N comprising (a), wherein adding the DFR concentrate into the slurry in the slurry blender comprises adding the DFR into the slurry blender at or near a bottom thereof.

Embodiment P: The method of Embodiment O, wherein adding the DFR into the slurry blender at or near the bottom thereof comprises adding the DFR concentrate into the slurry blender via a drain line thereof.

Embodiment Q: The method of any of Embodiment A through Embodiment P, wherein the dry material comprises the proppant, and wherein introducing the proppant into the slurry blender comprises gravity feeding of the proppant into the slurry blender.

Embodiment R: The method of any of Embodiment A through Embodiment Q, wherein introducing the slurry stream comprising DFR into the formation comprises pumping the slurry stream or the slurry stream comprising DFR from the slurry blender to a slurry blender discharge manifold via a slurry bender discharge pump, and pumping the slurry stream comprising DFR from the slurry blender discharge manifold into the formation via one or more high horsepower pumps (HHP) associated with an HHP suction side discharge manifold.

Embodiment S: The method of Embodiment R, wherein the one or more high horsepower pumps comprise positive displacement pumps.

Embodiment T: The method of any of Embodiment R or Embodiment S, wherein the one or more high horsepower pumps comprise sequential multistage pumps.

Embodiment U: The method of any of Embodiment R through Embodiment T, wherein the one or more HHP operate during the pumping of the slurry stream comprising DFR at a pressure of greater than or equal to about 3,000 psi, 5,000 psi, 10,000 psi, 20,000 psi, 30,000 psi, 40,000 psi, or 50,000 psi.

Embodiment V: The method of any of Embodiment A through Embodiment U, wherein the one or more HHP operate during the pumping of the slurry stream comprising DFR at a volumetric flow rate of greater than or equal to about 3, 6, 20, 50, 80, 120 or 150 barrels per minute (BPM), or in a range of from about 1 to about 150, from about 50 to about 120, or from about 3 to about 150 BPM.

Embodiment W: The method of any of Embodiment A through Embodiment V, wherein the slurry stream comprising DFR is a fracturing fluid.

Embodiment X: The method of any of Embodiment A through Embodiment W, wherein combining DFR with the amount of water to provide the DFR concentrate further comprises mixing water with the DFR in a mixer to form the DFR concentrate and removing the DFR concentrate from the mixer.

Embodiment Y: The method of Embodiment X further comprising introducing the DFR concentrate into a hydration unit, allowing the DFR in the DFR concentrate to hydrate for a hydration residence time in the hydration unit, and removing the DFR concentrate that is now hydrated from the hydration unit.

Embodiment Z1: The method of any of Embodiment A through Embodiment Y, wherein the method does not comprise allowing the DFR concentrate to hydrate in a hydration unit for a hydration residence time.

Embodiment Z2: The method of any of Embodiment A through Embodiment Z1, wherein the DFR concentrate is not subjected to shear in a slurry blender suction pump utilized to introduce the aqueous fluid to the slurry blender, the slurry blender, or a slurry blender discharge pump operable to pump slurry from the slurry blender to a slurry blender discharge manifold.

Embodiment Z3: A system for adding a slurry comprising dry friction reducer (DFR) into a subterranean formation, the system comprising: a slurry blender comprising an agitator and configured to produce a slurry comprising a proppant in an aqueous-based fluid; a slurry blender suction pump fluidly connected with the slurry blender and with a slurry blender suction manifold and operable to introduce the aqueous-based fluid from the slurry blender suction manifold into the slurry blender; a slurry blender discharge pump fluidly connected via a slurry blender discharge line with an outlet of the slurry blender and operable to introduce slurry from the slurry blender into a slurry blender discharge manifold; one or more high horsepower pumps (HHP) fluidly connected via an HHP manifold and a slurry blender discharge manifold outlet line with the slurry blender discharge manifold and operable to inject the slurry from the HHP manifold into the formation; and (a) apparatus configured for introducing DFR in dry, powdered form directly into the slurry blender to produce the slurry comprising DFR that is removed from the slurry blender via the slurry blender discharge line; and/or (b) DFR concentrate production apparatus configured to provide a DFR concentrate comprising water and DFR, and (i) a line fluidly connecting the DFR concentrate production apparatus with a drain line of the slurry blender, whereby the DFR concentrate is introduced into a bottom of the slurry blender, and the slurry comprising DFR is removed from the slurry blender via the slurry blender discharge line, (ii) a line fluidly connecting the DFR concentrate production apparatus with the slurry blender discharge line upstream of the slurry blender discharge pump, whereby the DFR concentrate is introduced into the slurry in the slurry blender discharge line to provide the slurry comprising DFR; (iii) a line fluidly connecting the DFR concentrate production apparatus with the slurry blender discharge line downstream of the slurry blender discharge pump and upstream of the slurry blender discharge manifold and/or into the slurry blender discharge manifold, whereby the DFR concentrate is introduced into the slurry in the slurry blender discharge line or the slurry blender discharge manifold to provide the slurry comprising DFR; (iv) a line fluidly connecting the DFR concentrate production apparatus with the slurry blender discharge manifold outlet line downstream of the slurry blender discharge manifold and upstream of the HHP suction side discharge manifold and/or into the HHP suction side discharge manifold, whereby the DFR concentrate is introduced into the slurry in the slurry blender discharge manifold outlet line and/or the HHP manifold to provide the slurry comprising DFR; or (v) a combination thereof.

Embodiment Z4: The system of Embodiment Z3, wherein the DFR concentrate production apparatus configured to provide the DFR concentrate comprising water and DFR further comprises a mixer configured to mix the DFR with the water to produce the DFR concentrate and a pre-gel blender suction pump fluidly connected with the mixer and configured to introduce water into the mixer.

Embodiment Z5: The system of Embodiment Z4, wherein the DFR concentrate production apparatus further comprises a pre-gel blender discharge pump downstream of the mixer and configured to pump the DFR concentrate downstream, and optionally a hydration unit fluidly connected with and downstream of the mixer and fluidly connected with and upstream of the pre-gel blender discharge pump, wherein the hydration unit optionally comprises baffles and is designed to allow a residence time for hydration of the DFR in the DFR concentrate.

Embodiment Z6: The system of any of Embodiment Z3 through Z5, comprising (ii), (iii), (iv), or a combination thereof.

Embodiment Z7: The system of any of Embodiment Z3 through Z6, wherein the system does not comprise a hydration unit designed to allow a residence time for hydration of the DFR in the DFR concentrate.

Embodiment Z8: The system of any of Embodiment Z3 through Z7 further comprising a pump configured to increase the pressure of the DFR concentrate to a pressure sufficient (e.g., greater than or equal to) a pressure of an apparatus or line into which the DFR concentrate is introduced.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of placing a slurry stream comprising dry friction reducer (DFR) into a subterranean formation penetrated by a wellbore, the method comprising:
   forming a slurry comprising an aqueous-based fluid and a proppant, wherein forming the slurry comprises introducing a dry material comprising the proppant and the aqueous-based fluid into a slurry blender;
   forming a slurry stream comprising DFR by:
   (a) forming a DFR concentrate by combining DFR with an amount of water; adding the DFR concentrate into the slurry in the slurry blender, whereby the DFR concentrate is introduced into a location within the slurry blender distant a location at which the dry material is added thereto, wherein adding the DFR concentrate into the slurry in the slurry blender at the distant location comprises adding the DFR into the slurry blender via a line at or near a bottom thereof; and removing the slurry stream comprising DFR from the slurry blender;
   (b) forming a DFR concentrate by combining DFR with an amount of water; removing a slurry stream from the slurry blender; and adding the DFR concentrate into the slurry stream to provide the slurry stream comprising DFR;
   (c) introducing DFR, in dry powder form, into the slurry blender and removing the slurry stream comprising DFR from the slurry blender; or
   (d) a combination of (a), (b), and/or (c); and
   introducing the slurry stream comprising DFR into the formation via the wellbore.

2. The method of claim 1, wherein the DFR is a fast acting friction reducer.

3. The method of claim 1, wherein the DFR is a high viscosity dry friction reducer (HVDFR) defined as a DFR that comprises a fluid which lowers the particle critical sedimentation velocity of the slurry.

4. The method of claim 3, wherein the HVDFR comprises a polymer.

5. The method of claim 1, wherein the proppant comprises sand, treated sand, ceramic materials, man made particles, particles comprising a polymeric material, particles of material sourced from flora (plant kingdom), particles comprising a composite, particles comprising a primary structural material and a secondary added material, or a combination thereof.

6. The method of claim 1, comprising (a), and wherein adding the DFR into the slurry blender via the line at or near the bottom thereof comprises adding the DFR concentrate into the slurry blender via a drain line thereof.

7. The method of claim 1, wherein the dry material comprises the proppant, and wherein introducing the proppant into the slurry blender comprises gravity feeding of the proppant into the slurry blender.

8. The method of claim 1, wherein introducing the slurry stream comprising DFR into the formation comprises pumping the slurry stream or the slurry stream comprising DFR from the slurry blender to a slurry blender discharge manifold via a slurry bender discharge pump, and pumping the slurry stream comprising DFR from the slurry blender discharge manifold into the formation via one or more high horsepower pumps (HHP) associated with an HHP suction side discharge manifold.

9. The method of claim 8:
   wherein the one or more high horsepower pumps comprise positive displacement pumps;
   wherein the one or more high horsepower pumps comprise sequential multistage pumps;
   wherein the one or more HHP operate during the pumping of the slurry stream comprising DFR at a pressure of greater than or equal to about 3,000 psi; and/or
   wherein the one or more HHP operate during the pumping of the slurry stream comprising DFR at a volumetric flow rate in a range of from about 3 to about 150 BPM.

10. The method of claim 1, wherein combining DFR with the amount of water to provide the DFR concentrate further comprises mixing water with the DFR in a mixer to form the DFR concentrate and removing the DFR concentrate from the mixer.

11. The method of claim 1, wherein the method does not comprise allowing the DFR concentrate to hydrate in a hydration unit for a hydration residence time.

12. The method of claim 1 wherein the DFR concentrate is not subjected to shear in a slurry blender suction pump utilized to introduce the aqueous fluid to the slurry blender, the slurry blender, or a slurry blender discharge pump operable to pump slurry from the slurry blender to a slurry blender discharge manifold.

13. A system for adding a slurry comprising dry friction reducer (DFR) into a subterranean formation, the system comprising:
   a slurry blender comprising an agitator and configured to produce a slurry comprising a proppant in an aqueous-based fluid;
   a slurry blender suction pump fluidly connected with the slurry blender and with a slurry blender suction manifold and operable to introduce the aqueous-based fluid from the slurry blender suction manifold into the slurry blender;
   a slurry blender discharge pump fluidly connected via a slurry blender discharge line with an outlet of the slurry blender and operable to introduce slurry from the slurry blender into a slurry blender discharge manifold;
   one or more high horsepower pumps (HHP) fluidly connected via an HHP manifold and a slurry blender discharge manifold outlet line with the slurry blender discharge manifold and operable to pump the slurry from the HHP manifold into the formation; and
   (a) apparatus configured for introducing DFR in dry, powdered form directly into the slurry blender to produce the slurry comprising DFR that is removed from the slurry blender via the slurry blender discharge line; and/or (b) DFR concentrate production apparatus configured to provide a DFR concentrate comprising water and DFR, and (i) a line fluidly connecting the DFR concentrate production apparatus with a drain line of the slurry blender, whereby the DFR concentrate is introduced into a bottom of the slurry blender, and the slurry comprising DFR is removed from the slurry blender via the slurry blender discharge line, (ii) a line fluidly connecting the DFR concentrate production apparatus with the slurry blender discharge line upstream of the slurry blender discharge pump, whereby the DFR concentrate is introduced into the slurry in the slurry blender discharge line to provide the slurry comprising DFR; (iii) a line fluidly connecting the DFR concentrate production apparatus with the slurry blender discharge line downstream of the slurry blender discharge pump and upstream of the slurry blender discharge manifold and/or into the slurry blender discharge manifold, whereby the DFR concentrate is introduced into the slurry in the slurry blender discharge line or the slurry blender discharge manifold to provide the slurry comprising DFR; (iv) a line fluidly connecting the DFR concentrate production apparatus with the slurry blender discharge manifold outlet line downstream of the slurry blender discharge manifold and upstream of the HHP suction side discharge manifold and/or into the HHP suction side discharge manifold, whereby the DFR concentrate is introduced into the slurry in the slurry blender discharge manifold outlet line and/or the HHP manifold to provide the slurry comprising DFR; or (v) any combination of (i) to (iv).

14. The system of claim 13, wherein the DFR concentrate production apparatus configured to provide the DFR concentrate comprising water and DFR further comprises a mixer configured to mix the DFR with the water to produce the DFR concentrate and a pre-gel blender suction pump fluidly connected with the mixer and configured to introduce water into the mixer.

15. The system of claim 14, wherein the DFR concentrate production apparatus further comprises a pre-gel blender discharge pump downstream of the mixer and configured to pump the DFR concentrate downstream, and/or a hydration unit fluidly connected with and downstream of the mixer and fluidly connected with and upstream of the pre-gel blender discharge pump, wherein the hydration unit optionally comprises baffles and is designed to allow a residence time for hydration of the DFR in the DFR concentrate.

16. The system of claim 13, wherein the system does not comprise a hydration unit designed to allow a residence time for hydration of the DFR in the DFR concentrate.

17. A method of placing a slurry stream comprising dry friction reducer (DFR) into a subterranean formation penetrated by a wellbore, the method comprising:

forming a slurry comprising an aqueous-based fluid and a proppant, wherein forming the slurry comprises introducing a dry material comprising the proppant and the aqueous-based fluid into a slurry blender;

forming a slurry stream comprising DFR by:

(a) forming a DFR concentrate by combining DFR with an amount of water; removing a slurry stream from the slurry blender; and adding the DFR concentrate into the slurry stream to provide the slurry stream comprising DFR;

(b) introducing DFR, in dry powder form, into the slurry blender and removing the slurry stream comprising DFR from the slurry blender; or (c) a combination of (a), and/or (b); and introducing the slurry stream comprising DFR into the formation via the wellbore.

18. The method of claim 17, comprising (a), wherein removing the slurry stream from the slurry blender comprises pumping the slurry stream from the slurry blender to a slurry blender discharge manifold via a slurry blender discharge pump and introducing the slurry stream from the slurry blender discharge manifold into a high horsepower pump (HHP) manifold, and wherein adding the DFR concentrate into the slurry stream to provide the slurry stream comprising DFR comprises (i) adding the DFR concentrate into the slurry stream upstream of the slurry blender discharge pump, (ii) adding the DFR concentrate into the slurry stream downstream of the slurry blender discharge pump and upstream of and/or directly into the slurry blender discharge manifold, and/or (iii) adding the DFR concentrate into the slurry stream downstream of the slurry blender discharge manifold and upstream of and/or directly into the HHP manifold.

19. The method of claim 18:

comprising (i), wherein the DFR concentrate is injected into the slurry stream at a pressure greater than the slurry blender discharge pump suction pressure;

comprising (ii), wherein the DFR concentrate is added to the slurry stream at a pressure greater than the pressure of the slurry blender discharge manifold;

comprising (iii), wherein the DFR concentrate is added to the slurry stream at a pressure greater than the pressure of the slurry blender discharge manifold; and/or (iv) wherein the DFR concentrate is added to the slurry stream partly by (i) and/or at a pressure greater than the slurry blender suction manifold and partly by (ii) and/or (iii).

20. The method of claim 18, comprising (ii) adding the DFR concentrate into the slurry stream downstream of the slurry blender discharge pump and upstream of and/or directly into the slurry blender discharge manifold, and/or (iii) adding the DFR concentrate into the slurry stream downstream of the slurry blender discharge manifold and upstream of or directly into the HHP manifold, such that the DFR concentrate is not subjected to pumping shear associated with a slurry blender suction pump configured to introduce the aqueous-based fluid into the slurry blender, pumping shear associated with the slurry blender discharge pump, or shear associated with an agitator of the slurry blender.

* * * * *

UNITED STATES PATENT AND TRADEMARK OFFICE
CERTIFICATE OF CORRECTION

PATENT NO. : 10,920,535 B1  
APPLICATION NO. : 16/573270  
DATED : February 16, 2021  
INVENTOR(S) : Bryan Chapman Lucas et al.

Page 1 of 1

It is certified that error appears in the above-identified patent and that said Letters Patent is hereby corrected as shown below:

In the Specification

-Column 9, Line 3, replace "a pressure P' (equal to pressure P"+$\Delta P$)" with --a pressure P''' (equal to pressure P'' + $\Delta P$)--.

-Column 9, Line 23, replace "(equal to P'=P'+ $\Delta P$)" with --(equal to P''' = P' + $\Delta P$)--.

-Column 9, Line 39, replace "and P' is substantially" with --and P''' is substantially--.

-Column 14, Line 36, replace "pressure P' to a pressure P'." with --pressure P' to a pressure P'''.--.

-Column 14, Line 39, replace "that of P'." with --that of P'''.--.

-Column 14, Line 44, replace "between P' and P'." with --between P' and P'''.--.

-Column 14, Line 57, replace "increased by $\Delta P$ to pressure P'." with --increased by $\Delta P$ to pressure P'''.--.

-Column 14, Line 59, replace "and P' is substantially equal" with --and P''' is substantially equal--.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*